US006105046A

United States Patent [19]

Greenfield et al.

[11] Patent Number: 6,105,046

[45] Date of Patent: Aug. 15, 2000

[54] METHOD AND APPARATUS FOR IDENTIFYING, PREDICTING, AND REPORTING OBJECT RELATIONSHIPS

[75] Inventors: Stephen Greenfield, Burbank; Chris Huntley, Altadena; Medanie Phillips, Burbank, all of Calif.

[73] Assignee: Screenplay Systems, Inc., Burbank, Calif.

[21] Appl. No.: 09/030,873

[22] Filed: Feb. 25, 1998

Related U.S. Application Data

[62] Division of application No. 08/252,562, Jun. 1, 1994, Pat. No. 5,734,916.

[51] Int. Cl.[7] .......................... G06F 17/30; G06F 17/21; G06F 17/50

[52] U.S. Cl. .......................... 707/530; 707/531; 707/104; 434/118; 434/322; 704/1

[58] Field of Search .......................... 704/1, 10; 707/530, 707/531, 104, 2, 6, 200, 205, 500; 345/302, 326, 516, 28; 365/238.5; 395/823, 846; 711/1, 2, 3, 40

[56] References Cited

U.S. PATENT DOCUMENTS

| | | | |
|---|---|---|---|
| 5,021,976 | 6/1991 | Wexelblat et al. | 345/356 |
| 5,119,474 | 6/1992 | Beitel et al. | 345/302 |
| 5,153,830 | 10/1992 | Fisher et al. | 707/531 |
| 5,226,140 | 7/1993 | Yamamura | 395/307 |
| 5,235,679 | 8/1993 | Yoshizawa et al. | 345/336 |
| 5,274,758 | 12/1993 | Beitel et al. | 345/302 |
| 5,282,265 | 1/1994 | Rohra Suda et al. | 706/11 |
| 5,368,308 | 11/1994 | Darnell | 273/429 |
| 5,544,305 | 8/1996 | Ohmaye et al. | 345/326 |
| 5,659,792 | 8/1997 | Walmsley | 345/302 |

OTHER PUBLICATIONS

Okada, et al. : "Story Generation Based on Dynamics of the Mind", Computational Intelligence, vol. 8, No. 1, pp. 123–160, 1992.

Okada, N. and Tsutomu, E. "Story Generation Based on Synamics of the Mind," Computational Intelligence, vol. 8, No. 1, 1992, pp.123–160.

*Primary Examiner*—Joseph Thomas

*Attorney, Agent, or Firm*—Hecker & Harriman

[57] ABSTRACT

A method and apparatus for identifying, predicting and reporting relationships. The present invention uses a quad structure to describe relationships between dramatic units. Story elements, characters and appreciations are mapped onto the quad structure to reveal and constrain relationships. A storyform whose structure is described by the quad structure configuration and choices is identified and provided to a user.

9 Claims, 16 Drawing Sheets

Microfiche Appendix Included
(12 Microfiche, 780 Pages)

| CLASS | TYPE | VARIATION | ELEMENT | RANGE |
|---|---|---|---|---|
| 1–4 | 0–4 | 0–4 | 0–4 | 0–4 |

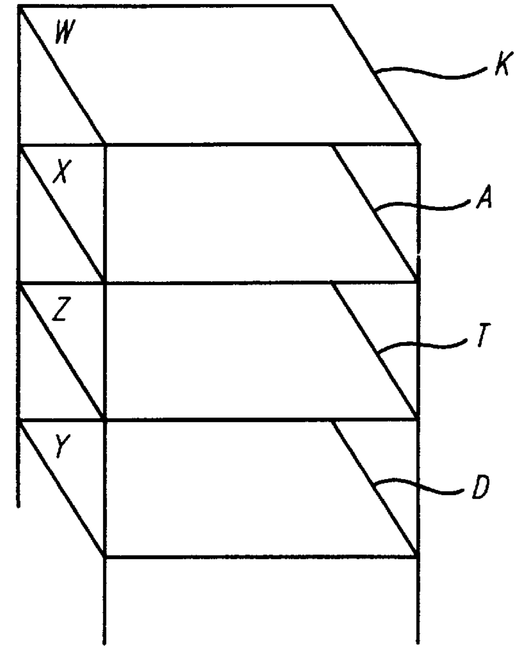
FIG. 3
FIG. 4
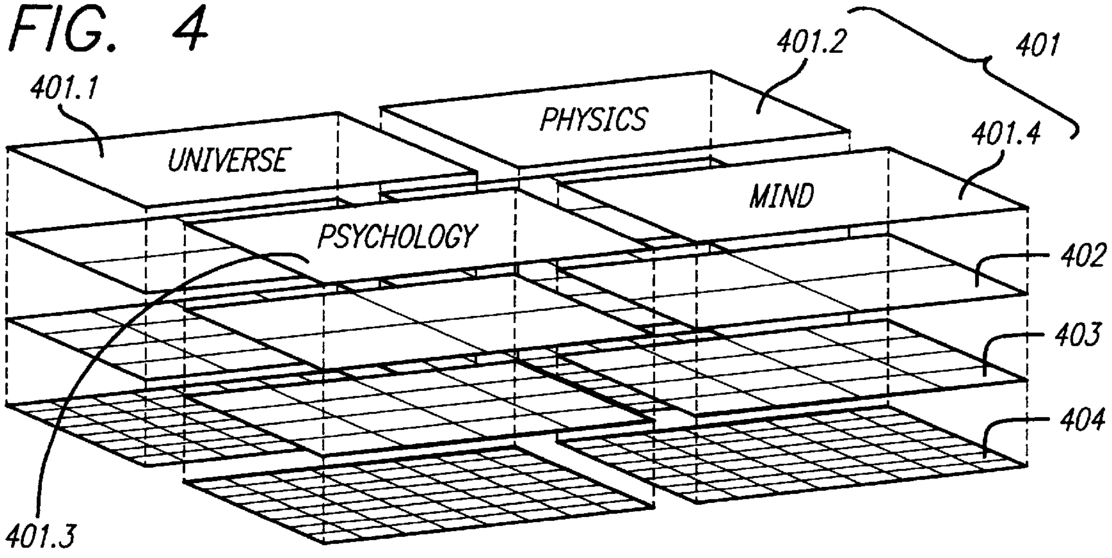
FIG. 5
| CLASS | TYPE | VARIATION | ELEMENT | RANGE |
|---|---|---|---|---|
| 1–4 | 0–4 | 0–4 | 0–4 | 0–4 |

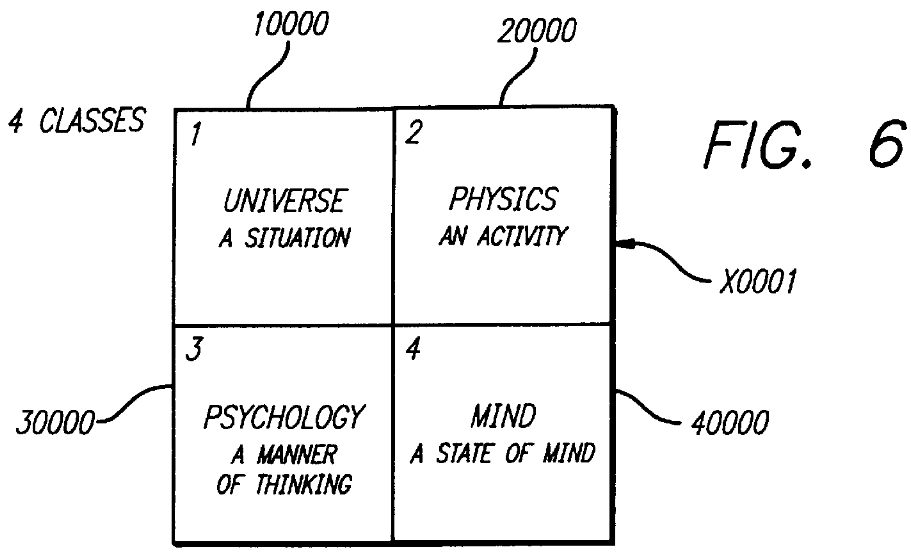
FIG. 6
FIG. 7
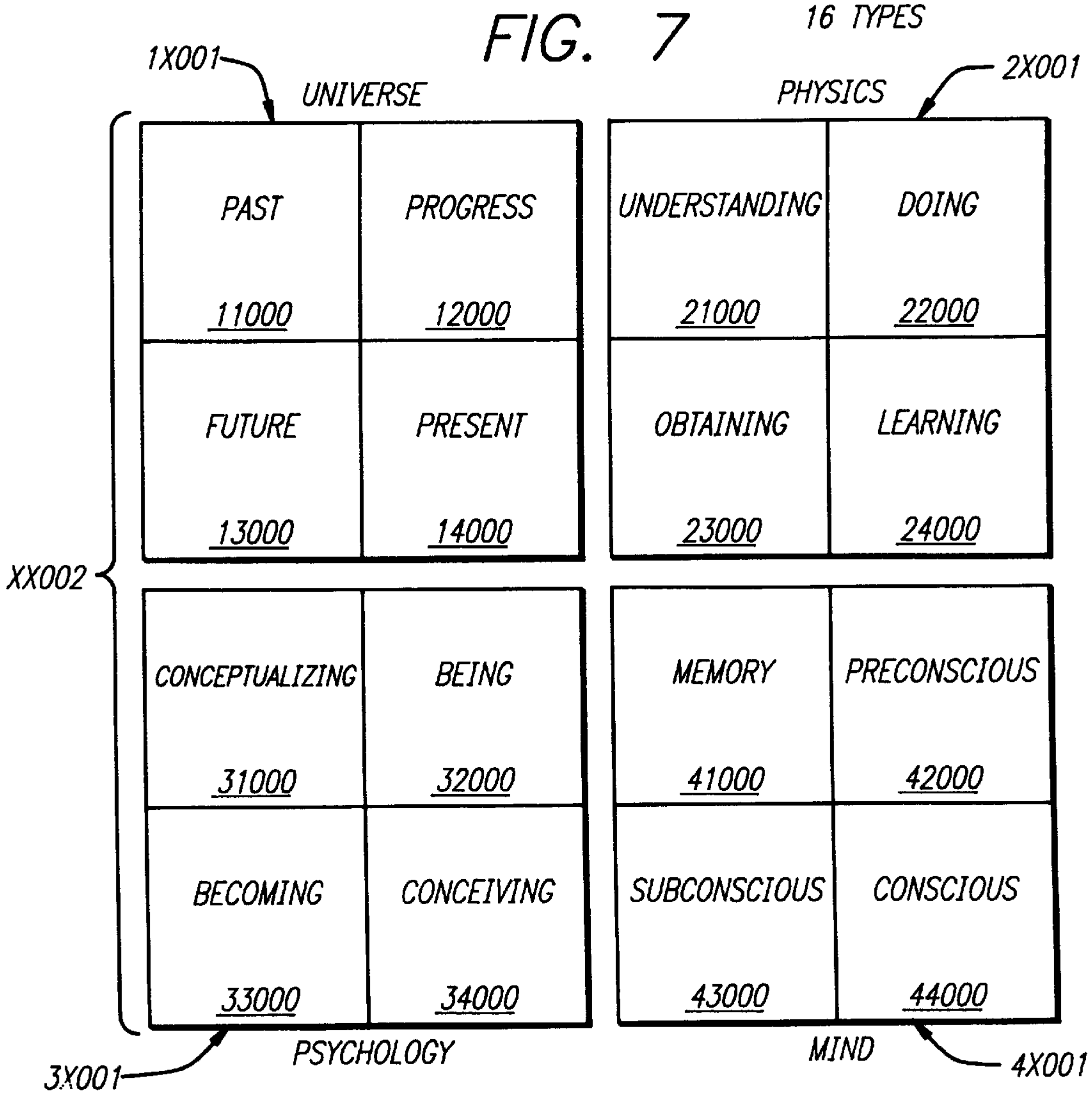
4 CLASSES
| 1 UNIVERSE<br>A SITUATION (10000) | 2 PHYSICS<br>AN ACTIVITY (20000) |
|---|---|
| 3 PSYCHOLOGY<br>A MANNER OF THINKING (30000) | 4 MIND<br>A STATE OF MIND (40000) |
X0001
16 TYPES
UNIVERSE (1X001)
| PAST 11000 | PROGRESS 12000 |
|---|---|
| FUTURE 13000 | PRESENT 14000 |
PHYSICS (2X001)
| UNDERSTANDING 21000 | DOING 22000 |
|---|---|
| OBTAINING 23000 | LEARNING 24000 |
PSYCHOLOGY (3X001)
| CONCEPTUALIZING 31000 | BEING 32000 |
|---|---|
| BECOMING 33000 | CONCEIVING 34000 |
MIND (4X001)
| MEMORY 41000 | PRECONSCIOUS 42000 |
|---|---|
| SUBCONSCIOUS 43000 | CONSCIOUS 44000 |
XX002

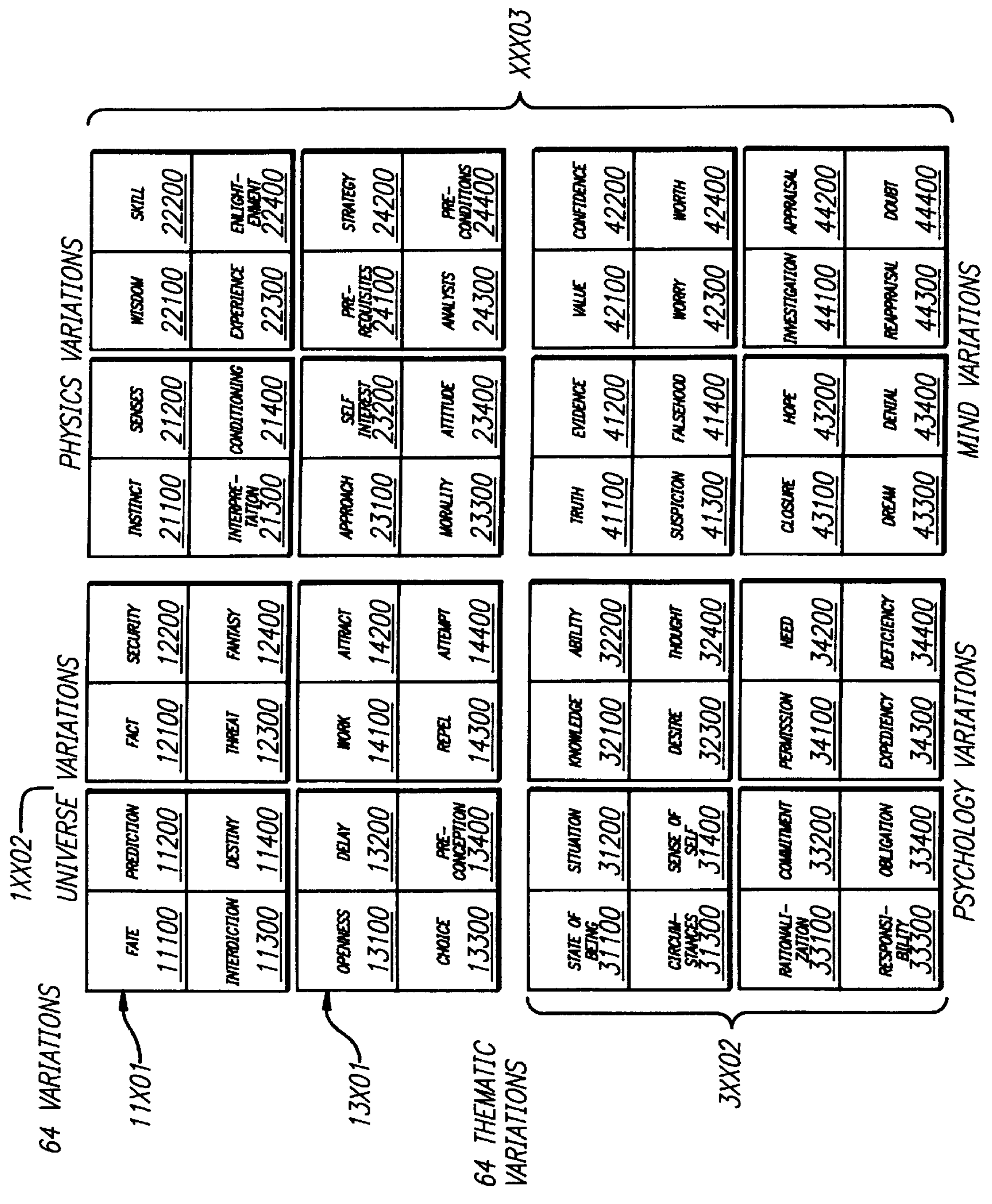

FIG. 8

| | UNIVERSE VARIATIONS | | | | PHYSICS VARIATIONS | | | |
|---|---|---|---|---|---|---|---|---|
| FATE 11100 | PREDICTION 11200 | FACT 12100 | SECURITY 12200 | INSTINCT 21100 | WISDOM 22100 | SENSES 21200 | SKILL 22200 |
| INTERDICTION 11300 | DESTINY 11400 | THREAT 12300 | FANTASY 12400 | INTERPRE-TATION 21300 | EXPERIENCE 22300 | CONDITIONING 21400 | ENLIGHT-ENMENT 22400 |
| OPENNESS 13100 | DELAY 13200 | WORK 14100 | ATTRACT 14200 | APPROACH 23100 | PRE-REQUISITES 24100 | SELF INTEREST 23200 | STRATEGY 24200 |
| CHOICE 13300 | PRE-CONCEPTION 13400 | REPEL 14300 | ATTEMPT 14400 | MORALITY 23300 | ANALYSIS 24300 | ATTITUDE 23400 | PRE-CONDITIONS 24400 |
| STATE OF BEING 31100 | SITUATION 31200 | KNOWLEDGE 32100 | ABILITY 32200 | TRUTH 41100 | VALUE 42100 | EVIDENCE 41200 | CONFIDENCE 42200 |
| CIRCUM-STANCES 31300 | SENSE OF SELF 31400 | DESIRE 32300 | THOUGHT 32400 | SUSPICION 41300 | WORRY 42300 | FALSEHOOD 41400 | WORTH 42400 |
| RATIONALI-ZATION 33100 | COMMITMENT 33200 | PERMISSION 34100 | NEED 34200 | CLOSURE 43100 | INVESTIGATION 44100 | HOPE 43200 | APPRAISAL 44200 |
| RESPONSI-BILITY 33300 | OBLIGATION 33400 | EXPEDIENCY 34300 | DEFICIENCY 34400 | DREAM 43300 | REAPPRAISAL 44300 | DENIAL 43400 | DOUBT 44400 |
| | PSYCHOLOGY VARIATIONS | | | | MIND VARIATIONS | | | |

64 VARIATIONS
1XX02
11X01
13X01
64 THEMATIC VARIATIONS
3XX02
XXX03

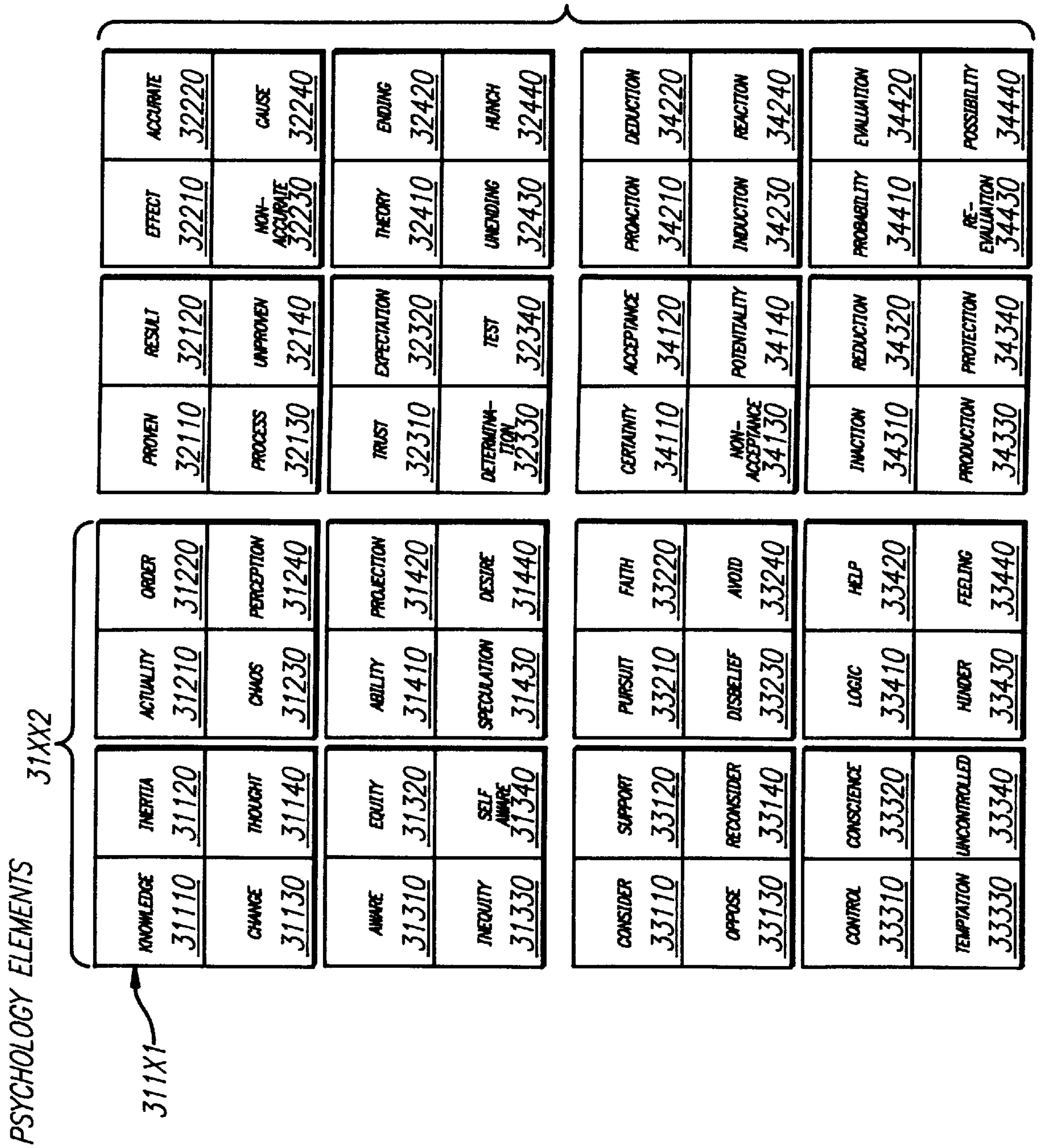

FIG. 11

| PSYCHOLOGY ELEMENTS 31XX2 | | | | | | | |
|---|---|---|---|---|---|---|---|
| KNOWLEDGE 31110 | INERTIA 31120 | ACTUALITY 31210 | ORDER 31220 | PROVEN 32110 | RESULT 32120 | EFFECT 32210 | ACCURATE 32220 |
| CHANGE 31130 | THOUGHT 31140 | CHAOS 31230 | PERCEPTION 31240 | PROCESS 32130 | UNPROVEN 32140 | NON-ACCURATE 32230 | CAUSE 32240 |
| AWARE 31310 | EQUITY 31320 | ABILITY 31410 | PROJECTION 31420 | TRUST 32310 | EXPECTATION 32320 | THEORY 32410 | ENDING 32420 |
| INEQUITY 31330 | SELF AWARE 31340 | SPECULATION 31430 | DESIRE 31440 | DETERMINATION 32330 | TEST 32340 | UNENDING 32430 | HUNCH 32440 |
| CONSIDER 33110 | SUPPORT 33120 | PURSUIT 33210 | FAITH 33220 | CERTAINTY 34110 | ACCEPTANCE 34120 | PROACTION 34210 | DEDUCTION 34220 |
| OPPOSE 33130 | RECONSIDER 33140 | DISBELIEF 33230 | AVOID 33240 | NON-ACCEPTANCE 34130 | POTENTIALITY 34140 | INDUCTION 34230 | REACTION 34240 |
| CONTROL 33310 | CONSCIENCE 33320 | LOGIC 33410 | HELP 33420 | INACTION 34310 | REDUCTION 34320 | PROBABILITY 34410 | EVALUATION 34420 |
| TEMPTATION 33330 | UNCONTROLLED 33340 | HINDER 33430 | FEELING 33440 | PRODUCTION 34330 | PROTECTION 34340 | RE-EVALUATION 34430 | POSSIBILITY 34440 |

311X1

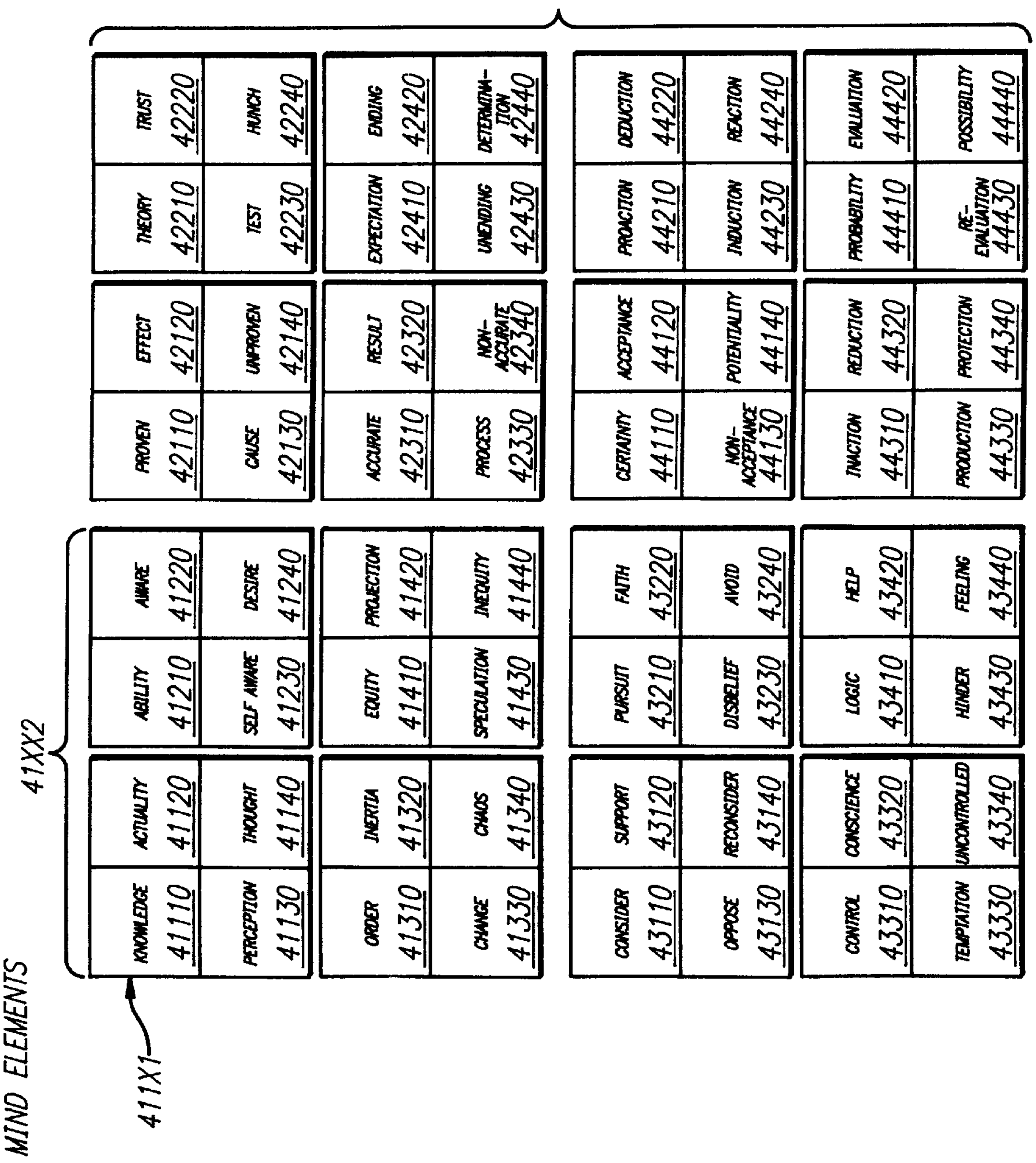

FIG. 12

MIND ELEMENTS

| KNOWLEDGE 41110 | ACTUALITY 41120 | ABILITY 41210 | AWARE 41220 | PROVEN 42110 | EFFECT 42120 | THEORY 42210 | TRUST 42220 |
|---|---|---|---|---|---|---|---|
| PERCEPTION 41130 | THOUGHT 41140 | SELF AWARE 41230 | DESIRE 41240 | CAUSE 42130 | UNPROVEN 42140 | TEST 42230 | HUNCH 42240 |
| ORDER 41310 | INERTIA 41320 | EQUITY 41410 | PROJECTION 41420 | ACCURATE 42310 | RESULT 42320 | EXPECTATION 42410 | ENDING 42420 |
| CHANGE 41330 | CHAOS 41340 | SPECULATION 41430 | INEQUITY 41440 | PROCESS 42330 | NON-ACCURATE 42340 | UNENDING 42430 | DETERMINA-TION 42440 |
| CONSIDER 43110 | SUPPORT 43120 | PURSUIT 43210 | FAITH 43220 | CERTAINTY 44110 | ACCEPTANCE 44120 | PROACTION 44210 | DEDUCTION 44220 |
| OPPOSE 43130 | RECONSIDER 43140 | DISBELIEF 43230 | AVOID 43240 | NON-ACCEPTANCE 44130 | POTENTIALITY 44140 | INDUCTION 44230 | REACTION 44240 |
| CONTROL 43310 | CONSCIENCE 43320 | LOGIC 43410 | HELP 43420 | INACTION 44310 | REDUCTION 44320 | PROBABILITY 44410 | EVALUATION 44420 |
| TEMPTATION 43330 | UNCONTROLLED 43340 | HINDER 43430 | FEELING 43440 | PRODUCTION 44330 | PROTECTION 44340 | RE-EVALUATION 44430 | POSSIBILITY 44440 |

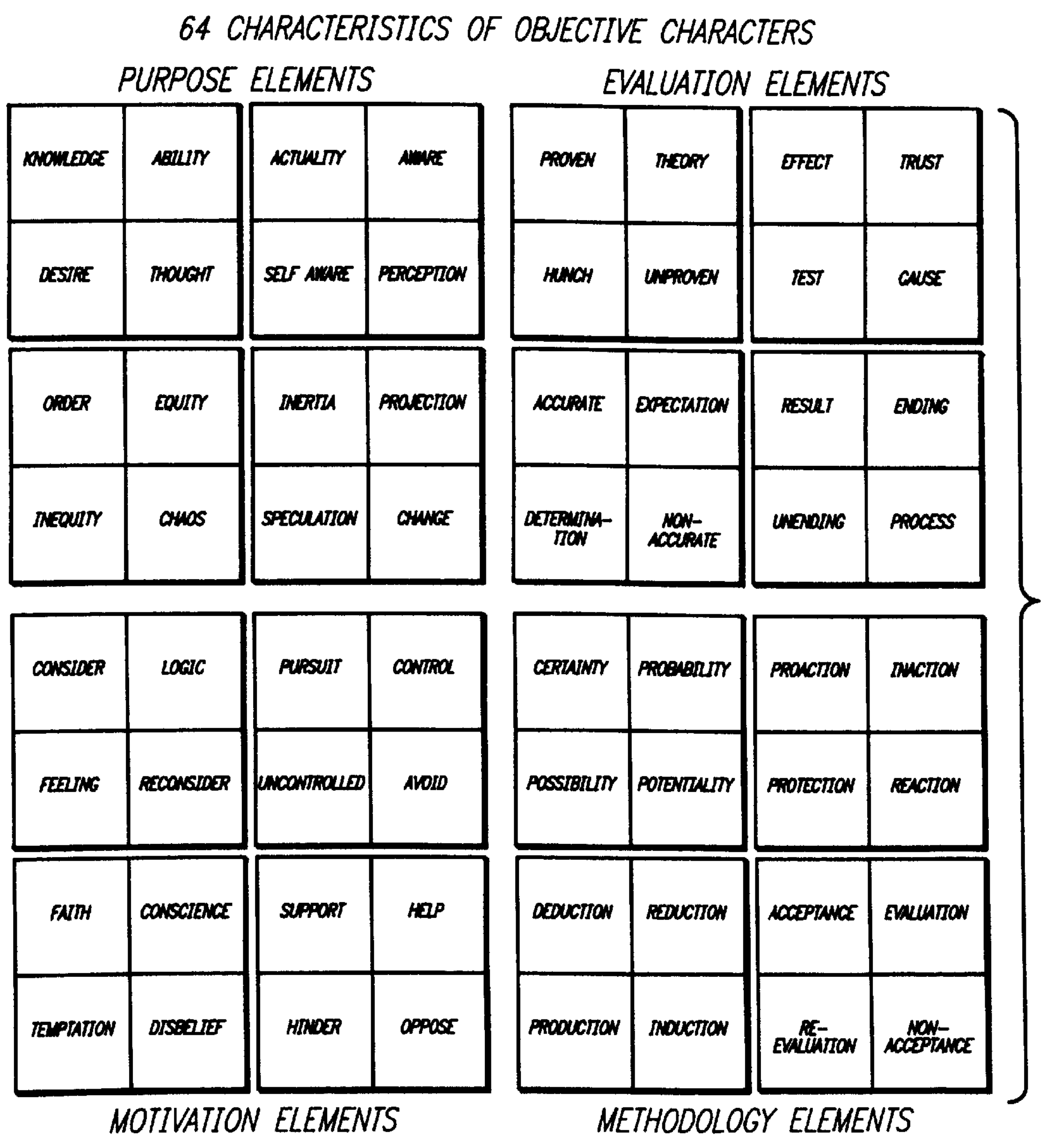

FIG. 13

64 CHARACTERISTICS OF OBJECTIVE CHARACTERS

| PURPOSE ELEMENTS | | | | EVALUATION ELEMENTS | | | |
|---|---|---|---|---|---|---|---|
| KNOWLEDGE | ABILITY | ACTUALITY | AWARE | PROVEN | THEORY | EFFECT | TRUST |
| DESIRE | THOUGHT | SELF AWARE | PERCEPTION | HUNCH | UNPROVEN | TEST | CAUSE |
| ORDER | EQUITY | INERTIA | PROJECTION | ACCURATE | EXPECTATION | RESULT | ENDING |
| INEQUITY | CHAOS | SPECULATION | CHANGE | DETERMINATION | NON-ACCURATE | UNENDING | PROCESS |
| CONSIDER | LOGIC | PURSUIT | CONTROL | CERTAINTY | PROBABILITY | PRODUCTION | INACTION |
| FEELING | RECONSIDER | UNCONTROLLED | AVOID | POSSIBILITY | POTENTIALITY | PROTECTION | REACTION |
| FAITH | CONSCIENCE | SUPPORT | HELP | DEDUCTION | REDUCTION | ACCEPTANCE | EVALUATION |
| TEMPTATION | DISBELIEF | HINDER | OPPOSE | PRODUCTION | INDUCTION | RE-EVALUATION | NON-ACCEPTANCE |

MOTIVATION ELEMENTS  METHODOLOGY ELEMENTS

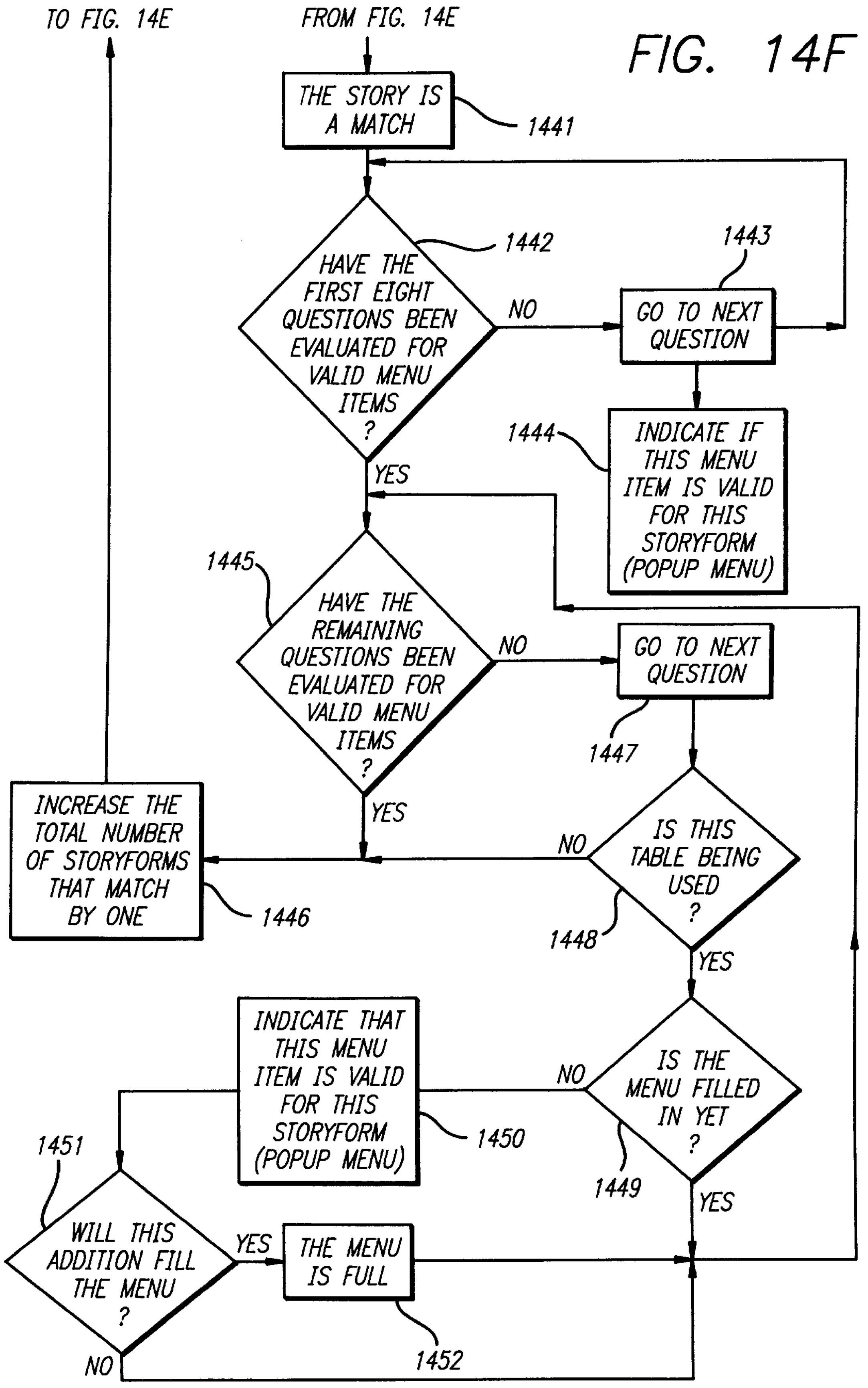
TO FIG. 14E
FROM FIG. 14E
FIG. 14F
THE STORY IS A MATCH
1441
HAVE THE FIRST EIGHT QUESTIONS BEEN EVALUATED FOR VALID MENU ITEMS ?
1442
NO
GO TO NEXT QUESTION
1443
INDICATE IF THIS MENU ITEM IS VALID FOR THIS STORYFORM (POPUP MENU)
1444
YES
HAVE THE REMAINING QUESTIONS BEEN EVALUATED FOR VALID MENU ITEMS ?
1445
NO
GO TO NEXT QUESTION
1447
YES
INCREASE THE TOTAL NUMBER OF STORYFORMS THAT MATCH BY ONE
1446
NO
IS THIS TABLE BEING USED ?
1448
YES
INDICATE THAT THIS MENU ITEM IS VALID FOR THIS STORYFORM (POPUP MENU)
1450
NO
IS THE MENU FILLED IN YET ?
1449
YES
1451
WILL THIS ADDITION FILL THE MENU ?
YES
THE MENU IS FULL
1452
NO

METHOD AND APPARATUS FOR IDENTIFYING, PREDICTING, AND REPORTING OBJECT RELATIONSHIPS

This is a divisional of application Ser. No. 08/252,562, filed Jun. 1, 1994 now U.S. Pat. No. 5,734,916.

This application includes a microfiche appendix which has a total of 12 microfiche having 780 frames.

BACKGROUND OF THE INVENTION

1. Field of the Invention

This invention relates to a method of identifying, predicting and reporting relationships.

2. Background Art

Mathematical models are used to represent complex systems that involve relationships of multiple elements. Examples of such mathematical models include models for economic systems, weather systems, stock market analysis, traffic patterns, artificial intelligence, expert systems, population growth, etc. These systems generally involve the processing of data associated with elements of the model using algorithms believed to represent behaviour of the elements with respect to the model. Such systems have not proven useful when attempts have been made to apply them to systems that do not lend themselves to quantifiable elements.

An example of such a system is the structure of stories. Ever since stories were first told, theorists have searched for patterns that would explain dramatic function and assist authors in creating sound structures. A number of prior art theories of structural analysis exist. These theories include deconstruction, semiotics, reception theory, etc. These prior art theories have the disadvantage of focussing on linear causal relationships in attempting to analyze stories.

These prior art systems ignore the fact that once a story has been told, it is no longer appreciated simply as a progression. Rather, a story is constructed and built up by its separate parts. By the time the story is complete, a construction has been created that is greater than the sum of its parts. The progression of a story, though linear in nature, ultimately constructs a greater meaning that is appreciated as a whole.

To perceive the essence of the "big picture", one must separate Storyform from Storytelling. Storyform is the unique arrangement of structure and dynamics that creates the dramatics of each story. Storytelling is the way that arrangement is illustrated. As an example, we might imagine an author wishing to communicate the abandonment of morality in favor of self-interest. To illustrate this concept the author might describe someone taking candy from a baby or drinking the last water in a lost desert patrol. The essential concept of morality vs. self-interest is part of the storyform. Either of these scenarios specifically used to make the point would be the storytelling.

Previous attempts to discover the inner workings of story have often incorporated storytelling as part of the theory. Storytelling is an expression of an arragangemt of story sturcture and dynamics that creates the dynamics of the story. When storytelling is combined with the structure of the story, the nature of the problem becomes too nonspecific and the number of possible solutions becomes infinite. These combinations create the enormous variety seen in stories, but also make the task of discovering the underlying patterns very difficult.

SUMMARY OF THE INVENTION

The present invention provides a model of story that is based on a "storyform". A storyform is the unique arrangement of structure and dynamics that creates the dramatics of a story. Storytelling is the way that arrangement (the storyform) is illustrated. As an example, consider the storyform consisting of the notion of the abandonment of morality in favor of self-interest. Storytelling applied to this storyform may result in a story descrbing (1) taking candy from a baby or (2) drinking the last water in a lost desert patrol. The storyform is morality vs. self-interest.

The storyform can be represented symbolically as a cubic construct referred to as a "quad structure". The model's components are finite in number and movable according to dynamic parameters. The structure consists of Dramatic Units that represent the processes of the story as objects. This has the effect of quantifying the interactions of a story into functions. Each dramatic unit is a function. To produce a complete storyform, each of these functions must act upon the audience in the proper place and time. It is the relationship between these Dramatic Units that varies from story to story, while the Dramatic Units still maintain their identity as a cube. Changing the position of the Dramatic Units shuffles their position in the fourth dimensional time/space of the model so that the order of events is intimately connected to the nature of the message being sent by the author. For example, Doing something so one can Obtain something creates different dramatic potentials than Obtaining something so one can Do something.

There are four vertical levels in the structural model representing four dimensions that group "families" of similar Dramatic Units. The levels tend to differentiate Character, Theme, Plot, and Perspective (sometimes referred tos as Genre). This does not mean, for example, that Character is confined to a specific level but rather that the audience's appreciation of dramatic functions perceived as character traits and relationships tends to focus at a particular level.

Each level is constructed of Quads, which are square frameworks containing four Dramatic Units. The quad form is a physical representation of the an underlying mathematical relationship of the model of the invention. The math of this equation has been translated into a quad pattern or matrix. Each position in the matrix represents a variable in the equation. In a sense, the Dramatic Units can be seen as dramatic functions that are treated as objects rather than processes so that they may be easily manipulated by an author. Similarly, the quad form represents an equation seen as a matrix.

Dramatic Functions are concepts that impart understanding to an audience. The relationship of the dramatic functions in the quad structure represent one of a number of possible storyforms.

In a storyform's neutral position, all dramatic functions are balanced by their position in the matrix. As a result, like functions are grouped together so that quads describe families of Dramatic Units. Each of the families is such that, although each Dramatic Unit in a family is unique, there are certain traits that describe the family as a whole.

The dynamics are represented in another matrix of choices containing a number of mutually exclusive dramatic intents. An example is whether a character should ultimately decide they have been wrong in their story-long approach and must change or should hold on to their resolve and remain steadfast. Additional dynamic choices determine whether the decision to change or remain steadfast leads to the character's ultimate success or failure in their endeavor, whether that is truly good or bad in the context of the story.

There are 256 Dramatic Units in the storyform in the preferred embodiment. Each is a different function having a unique meaning to and effect upon an audience. Once every Dramatic Unit is placed in one of the four positions in each of the quads that represent variables in the storyform's equation, values have been assigned to the entire fractal nature of the model creating a unique storyform. When an author makes dynamic choices for her or his story it rearranges the position of the Dramatic Units within affected quads. Quads are also rearranged within each fractal dimension. We call this process storyforming.

The meaning of a story derives not just from the dramatic potentials that exist, but the unique way in which they interact. As an audience interprets the progression of a story over time, each Dramatic Unit comes into conjunction with many others, creating dramatic tension that rises and falls over the course of the story. Sometimes dramatic potentials combine to create a greater overall potential. Other times they might cancel out, eliminating potential entirely.

The present invention provides a unique addressing scheme for representing units in locations of the quad structure. The addressing scheme is then utilized to generate relevent partners of a unit of interest, pursuant to desired relationships. As elements are selected in the quad structure and associated with story and character elements, other relationships become constrained by existing relationships. These constraints arise out of the nature of the quad structure. A benefit of these constraints is a predictive nature of the present invention. Given elements and relationships, other elements and other relationships fall into place automatically.

The possible relationships that comprise a storyform are maintained in a storyform table, or can be generated during operation. As elements and relationships are determined, the number of possible storyforms that satisfy the conditions is reduced, eventually leading to a single storyform that represents the choices made.

The present invention uses a quad structure for mapping relationships such that each quad on the structure has a consistent internal relationship, and each quad, or set of sixteen, or set of sixty-four, as well as each level, has the same relationship with neighbor quads, sets of sixteen, sets of sixty-four, and neighbor levels. A unique addressing scheme provides a method of indentifying multiple resolutions of objects, from unit level to chess sets of sixty-four units, with the same form of address. An algorithm for identifying partners of interest operates by changing only a single place of the address.

The present invention defines relationships between and among entries in the quad structure. When data is mapped to certain locations, the nature of the data and the destination address result in the identification of certain of those predefined relationships. In addition, other relationships are predicted based on constraints that arise from existing relationships. In the preferred embodiment, all possible relationships of the quad structure can be determined with as little as twelve pieces of information.

In the preferred embodiment of the invention, the mapping of data to the quad structure and the resulting relationships define storyforms that represent an outline of a story and the relationships between characters, thematics, plot, and dynamics. The invention permits a user to identify a storyform by mapping data to the quad structure.

BRIEF DESCRIPTION OF THE DRAWINGS

FIG. 3 illustrates the vertical relationship of the planes of the quad structure of the present invention.

FIG. 4 is a perspective view of the quad structure of the present invention.

FIG. 5 illustrates the values at each digit location in the addressing scheme of the present invention.

FIG. 6 illustrates the class level of the quad structure of the present invention.

FIG. 7 illustrates the type level of the quad structure of the present invention.

FIG. 8 illustrates the variations level of the quad structure of the present invention.

FIG. 11 illustrates the psychology class element level of the quad structure of the present invention.

FIG. 12 illustrates the mind class element level of the quad structure of the present invention.

FIG. 13 illustrates the characteristics of objective characters of the present invention.

FIGS. 14A–14F are flow diagrams describing the operation of selecting a storyform in the preferred embodiment of the present invention.

DETAILED DESCRIPTION OF THE INVENTION

Figure 1:
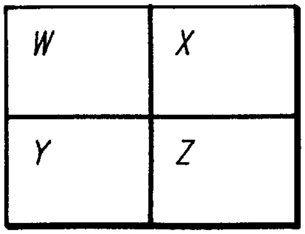
FIG. 1 illustrates a quad pattern.

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention provides a method of identifying, predicting and reporting relationships. In the preferred embodiment, and in the example described, the present invention provides a method for identifying, predicting, and reporting the relationships in a story to create a storyform.

A "storyform" is the dramatic structure or blueprint that contains the essence of the entire argument to be made. A storyform is a specific combination of elements and their dynamic influences on each other. Each storyform contains the entire set of story elements needed to create a complete story. In the preferred embodiment of the present invention, a storyform is represented as a plurality of appreciations.

In the present invention, there are certain commonly shared dramatic concepts that are present in a story. When a person attempts to deal with troubles, certain considerations and perspectives are commonly adopted such as "goals," "requirements," and "consequences." Stories, which represent analogies to this problem solving process, also incorporate these aspects. In the present invention, these shared considerations are referred to as "appreciations."

The way the model is explored is by measuring quads using each of three kinds of pairs known as dynamic pairs, companion pairs and dependent pairs. The process of measuring a quad three ways "triangulates" on the suspected meaning of how that quad is arranged internally, and a fourth appreciation provides the context of the quad as a whole in the overall storyform. There are several ways to create an order of events by scanning the storyform by pairs. Some of these make the outline of the big picture visible at the very beginning, then spend the rest of the progression filling in details until all is known. Other approaches start with the detail, then build outward to the big picture. In any case, only when the story is over does the audience have all the pieces necessary to know what it means on a grand scale.

Dramatic choices made by an author determine how dramatic units are to be moved, but we have not yet described how it is determined which dramatic units are going to be affected. To link both structure and dynamics, the author selects the nature of the problem by "zeroing in" on it through a number of choices . One way t o appreciate this concept is to start with a quad at the top level (class) and work down through the other three levels to the bottom of the structure.

The quad of classes consists of Universe, Physics, Mind, and Psychology. Each class describes an area in which the problem of the story seems to center. A problem in the Universe class involves a situation, which is a state in the environment. A problem in the Physics class concerns an activity, which is a process in the environment. Mind Class describes problems concerning a fixed attitude, or state of mind. The Psychology class contains problems with a manner of thinking, which is a process of the mind.

Once an author has decided upon a specific element as the center of the story's problem, it becomes the "lynch pin" for all of the story's dynamics. This Critical Element is the nodal point of the storyform: the single unit a round which all of the story's dissonance is built. All of the dynamics can now be applied to the structure in reference to that point. If one were to keep all dynamic choices the same but merely select a different critical element, the resulting storyform could have an entirely different meaning. However, since the structure is fractal in nature, sometimes a shift in position of the choice of critical element can result in differences in meaning, yet other times, differences in critical element position might have little effect other than nuance.

In a sense, experiencing the progression of the story is a subjective view, whereas observing the big picture after all the information is available is an objective view. In fact, the concept of a story having two vantage points clarifies many of the relationships between audience and story. One way to appreciate the difference between Subjective and Objective perspectives is to imagine each story as a battle. The Subjective view of the battle, the one that speaks to our emotions, puts us down in the trenches in the middle of the action. This is the realm of the Main Character and works to develop our empathy for her or him. The battle is also observed by a General on the hill, who, although concerned with the outcome, is not actually involved. This more dispassionate perspective is the Objective View. It is the dissonance between the Main Character's perspective and the Objective Reality provided by the author that carries the message of the story.

This dissonance is created in the following manner. Either the Subjective or Objective perspective will serve as the "measuring stick" for the audience, becoming the carrier wave or reference signal. A Subjective measuring stick sides with the Main Character and indicates they must hold on to their resolve. An Objective measuring stick sides with the universe at large, indicating the character should learn they are in error and change. All hat is explored in the story will be judged against this constant.

Quad Structure and Addressing

The quad structure of the preferred embodiment of the present invention is described with respect to FIGS. 1–13.

FIG. 1 illustrates a quad pattern in the present invention. A number of relationships are defined with respect to, and illustrated by, the quad pattern of FIG. 1. For purposes of example, the quad pattern consists of a 2×2 grid. The upper left hand location of the grid is referred to as location "W". The upper right hand location is referred as to location "X". The lower left hand location is referred to as location "Y". The lower right hand location is referred to as location "Z". The locations of the quad are defined to have the relationship expressed by W/Z=X*Y. That is, whatever is in location W is divided by the units in location Z and this expression is equivalent to the product of the units in location X and the unit in location Y.

In addition, a number of other relationships exist with respect to the quad of FIG. 1. A pair of units along the diagonal from location W to location Z is referred to as the "dynamic pair". The units on the diagonal from location X to location Y are referred to as the co-dynamic pair. The units from location W to location X are referred to as the "companion pair". The units along the line from location Y to location Z are defined as the "co-companion pair". The units in the line from location W to location Y referred to as the "dependent pair". The pair of units along the line from location X to location Z are referred to as the "co-dependent pair".

For purposes of example, the present invention uses parameters in the quads that can be thought of as representing the following:

Knowledge (K)

Thought (T)

Ability (A) and

Desire (D)

Figure 2A:
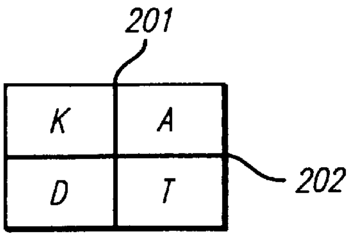
FIGS. 2A–2H illustrate a TKAD quad pattern in eight orientations.

The preferred embodiment of the present invention is a "Knowledge based system" so that K is in the upper left hand system of the quad pattern as shown in FIG. 2A. In a preferred embodiment, K is in a dynamic pair relationship with Thought and so T is in the lower right hand location of the quad pattern. K is in a companion relationship with Ability so that A is in the upper right hand location of the quad pattern. K is in a dependent relationship with Desire so that D is in the lower left hand position of the quad pattern. As defined above, the relationship of the placement of K, T, A, and D of FIG. 2A can be expressed by the equation:

$$K/T=A*D \qquad \text{(Equation 1)}$$

The quad pattern of FIG. 2A is altered by rotating the quad pattern about the axis 201 formed by the vertical line between the left and right side of the quad pattern pairs. This results in the pattern of FIG. 2B where A is in the upper left corner, K is in the upper right corner, T is in the lower left corner, and D is in the lower right corner. The relationship of the pattern of FIG. 2B is described by:

$$A/D=K*T \qquad \text{(Equation 2)}$$

Figure 2B:
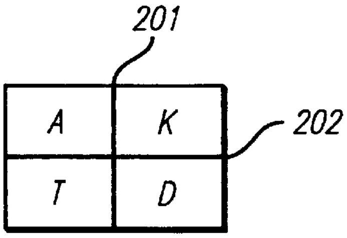

In the pattern of FIG. 2B, A and D are the dynamic pair, K and T are the co-dynamic pair, A and K are the companion pair, T and D are the co-companion pair, A and T are the dependent pair and K and D are the co-dependent pair.

The pattern is again changed by rotating the quad of FIG. 2B about the horizontal axis 202. This results in the pattern of FIG. 2C with T in the upper left hand corner, D in the upper right hand corner, A in the lower left hand corner, and K in the lower right hand corner. The relationship of the units of this pattern is expressed by:

$$T/K=D*A \qquad \text{(Equation 3)}$$

The dynamic pair is TK, the co-dynamic pair is DA, the companion pair is TD, the co-companion pair is AK, the dependent pair is TA, and the co-dependent pair is DK.

Figure 2C:
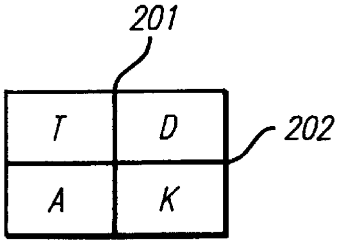
Figure 2D:
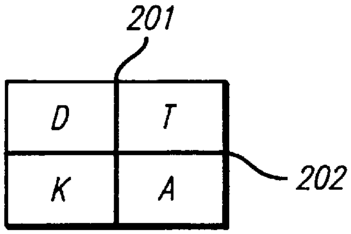

Rotating the pattern of FIG. 2C about axis 201 results in the pattern of FIG. 2D. In FIG. 2D, D is in the upper left corner, T in the upper right, K in the lower left and A in the lower right. DA is the dynamic pair, TK is the co-dynamic pair, DT is the companion pair, KA is the co-companion pair, DK is the dependent pair, and TA is the co-dependent pair. The relationships of the units of the pattern of FIG. 2D is expressed by:

$$D/A=T*K \quad \text{(Equation 4)}$$

Figure 2E:
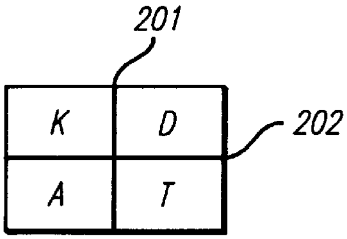

The quad can also be rotated on the diagonal to create new relationships. Referring to FIG. 2E, we see the pattern of this form by rotating the quad pattern of FIG. 2A about the diagonal from the upper left to the lower right. This results in the pattern with K in the upper left, D in the upper right, T in the lower right and A in the lower left. This relationship is described by:

$$K/T=D*A \quad \text{(Equation 5)}$$

The dynamic and co-dynamic pairs are KT and DA respectively, the companion and co-companion pairs are KD and AT respectively, and the dependent and co-dependent pairs are KA and DT respectively.

Figure 2F:
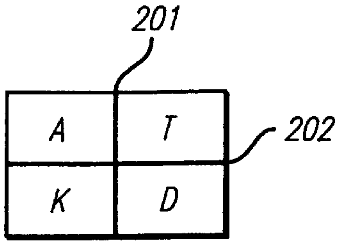

FIG. 2F illustrates the pattern of FIG. 2B rotated about the axis from the upper left to lower right. A is in the upper left, T is in the upper right, K is in the lower left, and D is in the lower right. This pattern is expressed by the equation:

$$A/D=T*K \quad \text{(Equation 6)}$$

The dynamic and co-dynamic pairs are AD and TK respectively, the companion and co-companion pairs are AT and KD respectively, and the dependent and co-dependent pairs are AK and TD respectively.

Figure 2G:
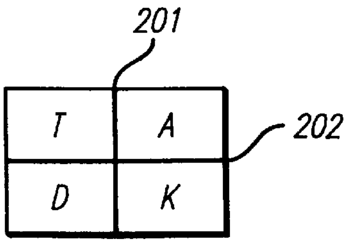

Rotating the pattern of FIG. 2C about the axis from the diagonal from upper left to lower right, results in the pattern of FIG. 2G. T is in the upper left, A is in the upper right, D is in the lower left, and K is in the lower right. This pattern is expressed by the equation:

$$T/K=A*D \quad \text{(Equation 7)}$$

The dynamic and co-dynamic pairs are TK and AD respectively, the companion and co-companion pairs are TA and DK respectively, and the dependent and co-dependent pairs are TD and AK respectively.

Figure 2H:
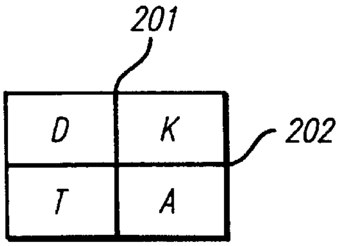

Rotating the pattern of FIG. 2D about the diagonal from the upper left to lower right results in the pattern of FIG. 2H where the dynamic and co-dynamic pairs are DA and KT respectively, the companion and co-companion pairs are DK and TA respectively, and the dependent and co-dependent pairs are DT and KA respectively. This pattern is expressed by the equation:

$$D/A=K*T \quad \text{(Equation 8)}$$

The expression on the right hand side of the equivalent sign is not a bi-directional or commutatable operation. That is, K*T is not the same as T*K.

The relationship described in FIGS. 1 and 2A–2H describes the relationship developments in the horizontal plane. The same relationship holds true in the vertical plane. Referring now to FIG. 3, four planes, W, X, Y and Z are illustrated with W being the highest plane followed by the X plane, the Z plane and the Y plane. The formula relationship among the locations of FIG. 1 holds true for the planes of FIG. 3, namely W/Z=X*Y. In the preferred embodiment of the invention, planes W, X, Z and Y are associated with the values K, A, T and D respectively. The relationship of these four values is governed by their location in the planes. The units in the W and Z planes always have a ratio relationship while the units in the X and Y planes always have a product relationship.

In the preferred embodiment, the present invention uses a "quadstructure" of units in physical locations that describe their effect upon one another. An overview of this quadstructure is illustrated in FIG. 4. In the quadstructure of the present invention, each unit at one level is associated with four units on the next level down. Referring to FIG. 4, the top level of the quadstructure is level 401 with levels 402, 403, and 404 below that level. In the present invention the top level is referred to as the "class" level and consists of the universe unit in the upper left corner, unit 401.1, a physics unit in the upper right corner, unit 401.2, a psychology unit 401.3 in the lower left corner and a mind unit 401.4 in the lower right corner. Below each unit of the class level 401 are four units at level 402. Level 402 is referred to as the "type" level. The type level 402 consists of four quadstructures, each consisting of a 2×2 array of units. As noted previously, since each unit of one level is associated with four units at the next lower level, and the level 401 consists of four units, level 402 consists of 16 units.

Each unit of level 402 is associated with four units on level 403. Thus, with sixteen units in level 402, there are 64 units in level 403. As can be seen, by extending the boundaries of each unit of level 402 to level 403, the boundaries sound four smaller proportioned units. Each 2×2 quadstructure of level 402 has an associated 4×4 structure at level 403.

Finally, each unit of level 403 has associated with it four units at level 404. Thus, level 404 consists of four 8×8 structures or 256 units. The relationship of four units and any 2×2 quadstructure at any level, is the same as the relationship described with respect to FIG. 1. That is, the units at locations W, X, Y and Z will have the relationship W/Z=X*Y. In addition, the relationship among the various levels is that as described with respect to FIG. 3. Namely, the first and third levels are in a dynamic relationship, and the second and fourth levels are in a co-dynamic relationship. The first and fourth level are in a dependent relationship and the second and third level are in a co-dependant relationship. The first and second level are in a companion relationship and the third and fourth level are in a co-companion relationship.

The preferred embodiment of the present invention relates to the creation of story forms in the identification of relationships and appreciations based on user input.

Quadstructure Units and Addressing Scheme

The present invention uses a five place addressing scheme to identify units in the quadstructure. The addressing scheme is illustrated in FIG. 5. In the scheme of FIG. 5, the most significant position of the addressing scheme at the left and the least significant position is at the right. The first position, the most significant position represents and identifies the class, the next position identifies the type, the next the variation and fourth the unit. The fifth place represents a range that allows the selection with a single address of a quad of units etc. up to an entire level of units. The class position can vary from a value of one to four to identify one of the four class level units. The numbering system relies on the following convention. The upper left hand corner of a quad is identified as location one, the upper right as location two, lower left as location three and lower right as location four. The type variation unit and range can all vary from zero to four. The values of one to four for type variation and element identify a quad position. A zero value in a type variation or element means that no unit is selected at that level. Typically, this means that the next higher level with a non-zero value is the level of interest. The range value is described further below with respect to particular examples.

FIG. 6 illustrates the class level of FIG. 4 in a two dimensional presentation. Location one in the top left is the universe unit, location two on the top right is the physics units, location three in the lower left is the psychology unit, and location four in the lower right is the mind unit. The top left, the universe unit is identified with the address 10000. The one in the most significant position indicates that the unit and the one location of the quad is the unit of interest. The zero in the type variation and unit locations indicates that there are no selections made at those levels. The zero and the range position indicates that it is only the unit indicated by the prior four places that is of interest. The address of the physics unit is 20000, the address of the psychology unit 30000, and the address of the mind unit is 40000. An entire quad can be selected with a single address in the present invention. Selecting the entire quad at the class level has a value of X0001 where X=don't care. The one in the range value means selecting the four members of the quad of which the units selected by the previous four address places indicates. Selecting any of the four class level units and then selecting a one in the range position selects all four of the units in the class level quad.

FIG. 7 illustrates the type level for each of the class units of FIG. 6. The type units of the universe class unit are illustrated in the upper left hand corner of FIG. 7. They include the past unit 11000, progress unit 12000, future unit 13000, and present unit 14000. The first position of the address is a 1 to indicate that these units are associated with the universe class unit. The second position selects one of the four units in the type level. The next two positions are zero indicate that there is no unit of interest below the type level. Finally, the range position of the address is a zeroed indicate that it is the unit selected by the second position which is of interest. To select the entire type quad, and address 1X001 is used.

The type quad of the physics unit of the class level includes understanding unit 21000, doing unit 22000, obtaining unit 23000, and learning unit 24000, the entire type quad is selected by the address 2X001.

The type quad associated with the psychology unit of the class level is illustrated in the lower left hand corner of FIG. 7. This includes the conceptualizing unit 31000, being unit 32000, becoming unit 33000, and conceiving unit 34000. This quad is selected by an address 3X001.

Memory unit 41000, preconscious unit 42000, subconscious unit 43000, and conscious unit 44000, make up the type quad associated with the mind unit of the class level. This quad is selected by an address 4X001. The entire type quad is selected by an address of the form XX002. At least one unit at the class and type level is selected. The variation and unit address positions are at zero and the range position has a value of two to indicate that a quad of quads is selected. That is that the 16 units associated with a selected type class unit are selected.

FIG. 8 illustrates the variations level for each unit of the class level. The universe variations consists of a quad of quads in the upper left hand corner of FIG. 8. Each quad is associated with one unit of the universe type level of FIG. 7. The units of each variation can be seen by reference to FIG. 8. For example, the variations associated with the past unit of the universe type level are fate 11000, prediction 11200, interdiction 11300, and destiny 11400. There is a quad of quads associated with each unit of the class level. And each quad of quads includes a quad associated with one unit of its associated type unit. The address of a quad of quads at the variations level is illustrated by reference to the quad of quads in the lower left hand comer of FIG. 8. This quad of quads is identified 3XX02. The three in the initial position refers to the psychology unit of the class level. The X in the second position means that any of the type units of FIG. 7 associated with the psychology unit may be selected. The X in the third position indicates that any of the units of the lower left hand corner of the variations level of FIG. 8 may be selected. The zero means that no lower levels are selected and the two in the last position means that a quad of quads is selected. A "quad of quad of quads" (referred to in the present invention as "chess set" of 64 units) may also be identified by a single address as illustrated in FIG. 8. Address XXX03 is used to indicate such a chess set of variation level units. X in the first three positions indicates that any of the class level type level and variation level items may be selected. The zero in fourth position indicates that nothing at the element level is selected and the three indicates that a chess set of items is to be selected. The chess set being those 64 units associated with the items chosen by the first three positions.

The lowest level in the preferred embodiment of the present invention is the element level. In the preferred embodiment, there are 64 units and they are the same in each class (universe, physics, psychology, and mind). However, the arrangement and location of the units in each class is different. The addresses and arrangements of the items at the element level can be determined by reference to FIGS. 9 through 12 which are the element levels for the universe, physics, psychology and mind class respectively. It should be noted that the addressing scheme of the present invention provides some method of referring to all of the items of the entire element level (a quad of chess sets) by any address of the form XXXX4. Four refers to a quad of chess sets.

The order of the items in each level illustrated in FIGS. 6 through 12 are referred to in the preferred embodiment of the present invention as a reference quad structure or "neutral" quad structure. The arrangement may be changed without departing from the scope of the present invention. The universe units all have an address beginning with 1, and the physics units, psychology units and mind units have addresses beginning with 2, 3 and 4 respectively.

FIG. 13 illustrates characteristics of objective characters in the preferred embodiment of the present invention. The upper left quarter of the items of FIG. 13 represent purpose units of an objective character. The items of FIG. 13 are the 64 units level items. The upper right hand quarter of FIG. 13 contains evaluation units of an objective character. The lower left hand corner contains motivation units and lower right hand corner contains methodology units.

The units of the quad tables are defined in a files referred to as "SEMTABLE.H" and "SEMTABLE.CC" illustrated in the microfiche appendix. The units and their definitions are described in the table below.

TABLE

| Domains (Classes) |
|---|
| Universe: a situation |
| Physics: an activity |

TABLE-continued

Psychology: a manner of thinking
Mind: a fixed attitude

Concerns (Types)

Becoming: transforming one's nature
Being: temporarily adopting a lifestyle
Conceiving: coming up with an idea
Conceptualizing: visualizing how an idea might be implemented
The Conscious: considerations
Doing: engaging in a physical activity
The Future: what will happen or what will be
Learning: gathering information or experience
Memory: recollections
Obtaining: achieving or possessing something
The Past: what has already happened
The Preconscious: immediate responses
The Present: the current situation and circumstances
Progress: the way things are going
The Subconscious: basic drives and desires
Understanding: appreciating the meaning of something Themes (Variations)

Ability: being suited to handle a task; the innate capacity to do or be
Analysis: evaluation of the situation and/or circumstances
Appraisal: an initial understanding
Approach: one's methodology of doing or being
Attempt: applying oneself to something not known to be within one's ability
Attitude: one's demeanor while doing or being
Attraction: drawing or being drawn to something
Choice: making a decision
Circumstances: the relationship of oneself to the environment
Closure: bringing something to an end
Commitment: a decision to stick with something regardless of the consequences
Conditioning: responses based on experience or training
Confidence: belief in the accuracy of an expectation
Deficiency: motivation based on lack
Delay: putting off until later
Denial: the refusal to let something go
Desire: the motivation to change one's situation or circumstances
Destiny: the future path an individual will take
Doubt: questioning validity without investigating to be sure
Dream: a desired future that requires unexpected developments
Enlightenment: an understanding that transcends knowledge
Evidence: information supporting a belief
Expediency: most efficient course considering repercussions
Experience: the gaining of familiarity
Fact: belief in something real
Falsehood: that which has been shown to be erroneous
Fantasy: belief in something unreal
Fate: a future situation that will befall an individual
Hope: a desired future if things go as expected
Instinct: intrinsic unconditioned responses
Interdiction: an effort to change a pre-determined course
Interpretation: determination of possible meaning
Investigation: gathering evidence to resolve questions of validity
Knowledge: that which one holds to be true
Morality: doing or being based on what is best for others
Need: that which is required
Obligation: accepting a task or situation in exchange for someone's potential favors
Openness: willingness to re-evaluate
Permission: one's ability based on what is allowed
Preconception: unwillingness to re-evaluate
Preconditions: limitations tacked on to an effort
Prediction: a determination of a future state of affairs
Prerequisites: preliminary steps that must be met
Rationalization: a logical altemative used to mask the real reason
Reappraisal: a reconsiderafion of a conclusion
Repulsion: pushing or being pushed away from
Responsibility: the belief that one is best suited to accomplish a task
Security: an evaluation of one's protections
Self-Interest: doing or being based on what is best for oneself
Sense-of-Self: one's perception of oneself
Senses: sensory observations
Situation: the arrangement of one's environment
Skill: practiced ability
State-of-Being: one's true self TABLE-continued Strategy: a plan to achieve one's purpose or a plan of response
Suspicion: questioning a belief based on evidence
Thought: the process of consideration
Threat: an evaluation of one's vulnerabilities
Truth: that which has been proven correct
Value: the objective usefulness of something in general
Wisdom: understanding how to apply Knowledge
Work: applying oneself to something known to be within one's ability
Worry: concern for the future
Worth: a rating of usefulness or desirability to oneself Elements Ability: being suited to handle a task; the innate capacity to do or be
Acceptance: a decision not to oppose
Accurate: being within tolerances
Actuality: an objective reality--the way things are
Avoidance: stepping around, preventing or escaping from a problem rather than solving it
Aware: being conscious of things outside oneself
Cause: the specific circumstances that lead to an effect
Certainty: a conclusion that something is absolutely true
Change: an alteration of a state or process
Chaos: random change or a lack of order
Conscience: foregoing an immediate benefit because of future consequences
Consider: weighing pros and cons
Control: a method based on organization and constraint
Deduction: a process of thought that determines certainty
Desire: the motivation to change one's situation or circumstances
Determination: a conclusion as to the cause behind a particular effect
Disbelief: the belief that something is untrue
Effect: the specific outcome forced by a cause
Ending: coming to a conclusion
Equity: a balance, fairness, or stability
Evaluation: an appraisal of a situation and/or circumstances
Expectation: a conclusion as to the eventual effect of a particular cause
Faith: accepting something as certain without proof
Feeling: an emotional sense of how things are going
Help: a direct assistance to another's effort to achieve their goal
Hinder: a direct detraction from another's effort to achieve their goal
Hunch: a conclusion based on intuition
Inaction: taking no action as a means of response
Induction: a means of determining possibility
Inequity: an unbalance, unfairness, or lack or stability
Inertia: a continuation of a state or process
Knowledge: that which one holds to be true
Logic: a rational sense of how things are related
Non-acceptance: a decision to oppose
Non-Accurate: not within tolerances
Oppose: an indirect detraction from another's effort
Order: an arrangement in which patterns are seen
Perception: the way things seem to be
Possibility: a determination that something might be true
Potentiality: a determination that something has the capacity to become true
Proaction: taking initiative action to achieve one's goals
Probability: a determination of likelihood
Process: the mechanism through which a cause leads to an effect
Production: a process of thought that determines potential
Projection: an extension of probability into the future
Protection: an effort to prevent one's concerns from being vulnerable to interference
Proven: a rating of knowledge based on corroboration
Pursuit: a directed effort to resolve a problem
Re-evaluation: a reappraisal of a situation or circumstances
Reaction: actions made in response
Reconsider: questioning a conclusion based on additional information
Reduction: a process of thought that determines probability
Result: the ramifications of a specific effect
Self-Aware: being conscious of one's own existence
Speculation: an extension of possibility into the future
Support: an indirect assistance given to anotherts efforts
Temptation: the urge to embrace immediate benefits despite possible consequences
Test: a trial to determine somethingts validity
Theory: an unbroken chain of relationships leading from a premise to a conclusion
Thought: the process of consideration
Trust: an acceptance of knowledge as proven without first testing its TABLE-continued

| |
|---|
| validity |
| Un-Ending: a continuance without cessation |
| Uncontrolled: a disorganized response |
| Unproven: a rating of knowledge that has not been tested |

Appreciations

As noted above, there are certain commonly shared dramatic concepts that are present in a story. In the present invention, these shared considerations are referred to as "appreciations." These appreciations are used to determine the mapping of characters, thematics, and plot on the quad structure, leading to the creation or selection of a storyform. Appreciations are best understood by describing the appreciations used in the present invention.

In the preferred embodiment of the present invention, appreciations can be categorized as character dynamics appreciations, plot dynamics appreciations, objective story appreciations, additional objective story appreciations, subjective story appreciations, main character appreciations, and obstacle character appreciations.

A number of appreciations in these categories are described below:

Character Dynamics

Resolve: Change or Steadfast?

Topic: At the moment of truth, every Main Character must determine whether to hold on to their resolve or to change in the hope of succeeding.

Main Character

Background: There are two ways in which an author can illustrate the best way to solve the problem explored in a story: One is to show the proper way of going about solving the problem, the other is to show the wrong way to solve the problem. To illustrate the proper way, the Main Character must hold on to their resolve and remain steadfast if they are to succeed, because they truly are on the right path. To illustrate the improper way of dealing with a problem, the Main Character must change to succeed, for they are going about it the wrong way. Of course, success is not the only outcome that can befall a Main Character. A way to illustrate that a way of dealing with a problem is improper would be to have the Main Character change their way of going about it and fail. Similarly, the improper way can be illustrated by a Main Character that remains steadfast and fails. So, choosing Change or Steadfast really has nothing directly to do with being correct or incorrect; it just describes whether the Main Character's ultimate resolve is to stay the course or try a different tack.

Storytelling Usage: Just because a Main Character should remain steadfast does not mean they don't consider changing. In fact, that is the temptation with which they are constantly faced: to give up or alter their approach in the face of ever-increasing opposition. Action oriented Steadfast stories throw physical hurdles at a Steadfast Main Character (e.g. James Bond as portrayed in most of the Bond films), whereas Decision oriented Steadfast stories throw mental or emotional hurdles at a Steadfast Main Character (e.g. Job in the Old Testament of the Bible). If, in spite of the difficulties or suffering, the Steadfast Main Character remains steadfast, the audience still may not want them to ultimately succeed. This occurs because simply being steadfast does not mean one is correct. If the audience is shown that a character is misguided yet remains steadfast, the audience will hope for their ultimate failure. Similarly, a Change Main Character does not mean they are changing all the time. In fact, in most cases, the Change Main Character will resist change, all the way to the moment of truth where they must choose once and for all to continue down the wrong path, or to jump to the right path by accepting change in themselves or their outlook.

Action oriented Change stories offer aids and benefits to assist the Main Character in continuing down the wrong path. Decision oriented Change stories provide mental or emotional gratification to the Main Character, again tempting them not to change. Regardless of the benefits to be had by remaining steadfast, the audience will want the Change Main Character ultimately to succeed if they are on the wrong path and change. However, if they do not change, the audience will want them to lose all the benefits they thought they had gained.

Impact: The selection of Change or Steadfast has wide ranging effects on the dynamics of the story. Such things as the relationship between the Objective and Subjective story lines and the order of exploration of the thematic points is adjusted in the model to create and support the ultimate decision of the Main Character to either change or remain steadfast.

Direction: Stop or Start?

Topic: Sometimes a problem is made worse by having too much of something, other times by having too little. In the "too much" scenario, the source of the trouble needs to Stop. In the "too little" scenario the remedy to existing trouble must Start. A Change Main Character must either grow into a new way of being (Start) or grow out of an old way of being (Stop). A Steadfast Main Character must grow to hold out until something good can Start or hold on until something bad Stops.

Background: Whether or not a Main Character eventually changes their nature or remains steadfast, they will still grow over the course of the story, as they develop new skills and understanding. This growth has a direction. Either they will grow into something (Start) or grow out of something (Stop). A Change Main Character grows either by adding a characteristic they lack (Start) or by dropping a characteristic they already have (Stop). Either way, their make up is changed in nature. As an example we can look to Scrooge. Does Scrooge need to change because he is mean or because he lacks kindness? Scrooge's problems stem not from his active meanness, but his passive lack of kindness. It is not that he is on the attack, but that he does not proactively seek to help others. So Scrooge needs to Start, rather than stop. This difference is important during storytelling to place the focus of conflict so as to support the argument of the story. With Steadfast Main Characters they will not add nor delete a characteristic, but will grow either by more strongly holding on against something bad, waiting for it to Stop, or by more strongly holding out until something good can Start.

For a Steadfast Character, growth is not a matter of change, but a matter of degree. The change appears not in themselves but in their environment. Change Characters actually alter their being, under the influence of environmental considerations. This illustrates both why it is often falsely thought that a Main Character MUST change, and also why steadfast characters are thought not to grow. To see growth in a Main Character one must look at both whether they are Change or Steadfast and also at the direction of the growth.

Storytelling Usage: A good way to get a feel for this dynamic in Change Characters is to picture the Stop character as having a chip on their shoulder and the Start character as having a hole in their heart. If the actions or decisions taken by the character are what make the problem worse, then they need to stop. If the problem worsens because the character fails to take certain "obvious" actions or decisions, then they need to start. Of course, to the character, neither of these problems is "obvious," as they must grow and learn to see it. Yet, the audience can empathize with the character's failure to see themselves as the source of the problem because the audience is afforded by the author another view the character does not get: the objective view. It is here that start and stop register with the audience as being obvious. Essentially, if you want to tell a story about someone who learns they have actually been making the problem worse, choose Stop. If you want to tell a story about someone who has allowed a problem to become worse, choose Start. For a Steadfast Main Character it will seem that their resolve needs to grow regardless of Start of Stop. But if they are a Start Character, they will be tempted by indications that the desired outcome is not going to happen or is unattainable. If they are a Stop Character, they will find themselves pressured to "give in." Remember that direction of growth in a Steadfast Character is largely seen in their environment. Their personal growth is seen as a matter of degree.

A Change story has a problem and its related solution. A Steadfast story has a Focus and Direction. By choosing Start or Stop, you tell the invention to shift the focus of the story to one over the other. This is accomplished by controlling the nature of the Character's concerns in relationship to the concerns of the Story and also by setting the relationship between theme and plot.

Approach: Do-er or Be-er?

Topic: In the attempt to solve problems, there are two places a Main Character might try to make progress: internally or externally. Some Main Characters prefer to take action first, and only try to adapt to the problem if action fails. We call this kind of Main Character a "Do-er." The other kind of Main Character prefers to work things out internally if they can, and only take action if deliberation fails. We call this kind of Main Character a "Be-er."

Background: By temperament, Main Characters (like each of us) have a preferential method of approaching problems. Some would rather adapt their environment to themselves, others would rather adapt themselves to their environment. There is nothing intrinsically right or wrong with either approach, yet it does affect how one will respond to problems. Choosing "Do-er" or "Be-er" does not prevent a Main Character from using either approach, but merely defines the way they are likely to first approach a problem, using the other method only if the first one fails.

Storytelling Usage: Do-er and Be-er should not be confused with active and passive. If a Do-er is seen as active physically, a Be-er should be seen as active mentally. While the Do-er jumps in an tackles the problem by physical maneuverings, the Be-er jumps in and tackles the problem with mental deliberations. The point is not which one is more motivated to hold their ground but how they try to hold it. A do-er would build a business by the sweat of their brow, a be-er would build a business by attention to the needs of their clients. Obviously both approaches are important, but Main Characters, just like the real people they represent, will have a preference. Having a preference does not mean being less able in the other area. A martial artist might choose to avoid conflict first as a be-er character, yet be quite capable of beating the tar out of an opponent if avoiding conflict proved impossible. Similarly, a school teacher might stress exercises and homework as a do-er character, yet open her heart to a student who needs moral support. When creating the Main Character, you may want someone who acts first and asks questions later, or you may prefer someone who avoids conflict if possible, then lays waste the opponent if they won't compromise. A do-er deals in competition, a be-er in collaboration.

Impact: The Main Character's affect on the story is both one of rearranging the dramatic potentials of the story, and also one of reordering the sequence of dramatic events. By choosing Do-er or Be-er you instruct the invention to establish one method as the Main Characters intent and the other as the result of her efforts.

Mental Sex: Male or Female?

Topic: Every Main Character has a Mental Sex. Even if the Main Character is physically sexless, such as a tree or a rock, It will possess a female or male mind. All minds evaluate their environments in terms of both space and time. A primary difference between male and female minds is which is evaluated first. This does not prevent either mind from looking at any issue from both perspectives, but does affect the order in which they are considered.

Background: Much of what we are as individuals is learned behavior. Yet the basic operating system of the mind is cast biologically before birth. Talents, intellectual capacity, instincts—all of these are not learned, but inherited. Among these traits are those specific to females and others specific to males. To be sure, we can go a long way toward balancing out those traits, yet that does not eliminate them nor diminish their impact. In dealing with the psychology of a Main Character, it is essential to understand upon which foundation their experience rests.

Storytelling Usage: A choice of male or female determines the manner in which the Main Character evaluates the problem, not the conclusions they come to. Typically, the choice is as simple as deciding if you want to tell a story about a man or a woman. But there is another consideration that is being employed with growing frequency in modern stories: putting the psyche of one sex into the skin of another. This does not refer only to the "sex change" comedies, but to action stories with female Main Characters (Ripley in "Alien") and decision stories with male Main Characters (Tom Wingo in "Prince of Tides").

Female or male does not in and of itself determine do-er or be-er nor action or decision. Rather, female or male describes an intrinsic perception of the meaning of life, a perception underlying the actual traits of the character. When an author writes a part for a man, they would intuitively create a male psyche for that character. Yet, by simply changing the name of the character from Joe to Mary and shifting the appropriate gender terms, the character would ostensibly become a woman. But that woman would not seem like a woman Even if all the specific masculine dialog were changed, even if all the culturally dictated manifestations were altered, the underlying psyche of the character would have a male bias, rather than a female bias.

Sometimes stereotypes are propagated by what an audience expects to see, which filters the message and dilutes the truth. By placing a female psyche in a male character or a male psyche in a female character, preconceptions no longer prevent the message from being heard. The word of warning is that this technique can make a Main Character seem "odd" in some hard to define way to the audience. So although the message may fare better, empathy between the audience and the Main Character may not.

Impact: All minds evaluate in terms of arrangement and in terms of sequence. By selecting female or male, you instruct the invention to order the arrangement and sequence of the Main Character's evaluations in an appropriate relationship.

Plot Dynamics

Work: Action or Decision?

Topic: A story might lean toward action or focus on deliberation (decision). This is independent of the nature of the Main Character. For example, in an action story, the Main Character may be more of a deliberator than a person of action. Therefore, it is important for an author to separate the nature of the Main Character from that of the story as a whole.

Background: Action or Decision describes how the story is driven forward. The question is: Do Actions precipitate Decisions or vice versa? At the end of a story there will be an essential need for an action to be taken and a decision to be made. However, one of them will be the roadblock that must be removed first in order to enable the other. This causal relationship is felt throughout the story where either actions would never happen on their own, except that decisions keep forcing them, or decisions would never be made except that actions leave no other choice than to decide.

Storytelling Usage: Stories contain both action and decision. Choosing one does not exclude the other. Rather it merely gives preference to one over the other. This preference can be enhanced or nearly balanced out by other dynamic questions you answer about the story. It's really a matter of the background against which you want the Main Character to operate. The choice of background does not have to reflect the nature of the Main Character. In fact, some very interesting dramatic potentials can be created when they do not match. For example, a Main Character of action (called a Do-er) forced by circumstance to handle a deliberation-type problem would find themselves at a loss for the experience and tools they need to do the job. Similarly, a deliberating Main Character (called a Be-er) would find themselves whipped into a turmoil if forced to resolve a problem requiring action. These mixed stories appear everywhere from tragedy to comedy and can add an extra dimension to an otherwise one sided argument.

Impact: Do Actions precipitate Decisions, or do Decisions precipitate Actions. Since a story has both, it is really a question of which came first: chicken or egg? By selecting one over the other, you instruct the invention to establish a causal order between dynamic movements in the Action line and the Decision line.

Limit: Timelock or Optionlock?

Topic: Every story would go on forever unless the Main Character reached a point where they are forced by circumstance to make a decision to change or remain steadfast in a "leap of faith." To reach this point, the Main Character must "run out of something." In a Timelock, the Main Character runs out of time. In an Optionlock, the Main Character runs out of options.

Background: No one can be sure of the future, including Main Characters. One of the functions of a story is to give the audience the value of experiences they have not had themselves by living through the Main Character. As such, the audience would have to take the story's message on faith to make use of it. To help with this, the Main Character must also make their decision based on faith. They decide and hope for the best, and we learn from their accomplishments or disappointments. Yet, even a Main Character would not jump into the void and commit to a course of action or decision unless forced into it. To force the Main Character to decide, the story provides all the necessary information to make an educated guess while progressively closing in on the Main Character until they have no alternative but to choose. This closing in can be accomplished in either of two ways. Either they run out of places to look for the solution or they run out of time to work one out. Running out of options is accomplished by an Optionlock. A deadline is accomplished by a Timelock. Both of these means of limiting the story and forcing the Main Character to decide are felt from early on in the story and get stronger until the moment of truth. Optionlocks need not be claustrophobic so much as they only provide limited pieces with which to solve the problem. Timelocks need not be hurried so much as limiting the interval during which something can happen.

Storytelling Usage: Choosing a Timelock or an Optionlock has a tremendous impact on the nature of the tension the audience will feel as the story progresses toward its climax. A timelock tends to take a single point of view and slowly fragment it until many things are going on at once. An optionlock tends to take many pieces of the puzzle and bring them all together at the end. So a timelock raises tension by dividing attention, and an optionlock raises tension by focusing it. Timelocks increase tension by bringing a single thing closer to being an immediate problem, optionlocks increase tension by building a single thing that becomes a functioning problem.

One cannot look just to the climax to determine if a Timelock or Optionlock is working. Indeed, both Time and Option locks work from the beginning of the story. A better way to gauge which is at work is to look at the nature of the obstacles thrown in the path of the Protagonist or Main Character. If the obstacles are primarily delays, a timelock is in effect if the obstacles are caused by missing essential parts, an optionlock is in effect. An author may feel more comfortable building tension by delays or building tension by missing pieces. Choose the kind of lock most meaningful for you.

Impact: A dramatic structure has both spatial and temporal frameworks adjusting themselves in arrangement or sequence appropriate to the author's message during the course of the story. Consistently throughout the story either a change in arrangement will force a change in sequence or a change in sequence will force a change in arrangement of dramatic potentials. Which one causes the other is controlled by the choice of Timelock or Optionlock.

Outcome: Success or Failure?

Topic: Success or Failure is determined by whether or not the Objective Characters achieve their original purpose in regard to the story problem.

Background: Although it can be tempered by degree, Success or Failure is easily determined by seeing if the Objective Characters have achieved what they set out to achieve at the beginning of the story. Certainly, they may learn that they really don't want what they thought they did and in the end not go for it. Even though they have grown, this is considered a failure—they did not achieve what they originally intended. Similarly, the Objective Characters may actually achieve what they wanted, and even though they find it unfulfilling or unsatisfying, it must be said they succeeded. The point here is not to pass a value judgment on the worth of their success or failure, but simply to determine if they actually did succeed or fail to achieve what they set out to achieve at the beginning of the story.

Storytelling Usage: For certain stories, it may be desired to have a very positive feel to the outcome by having success matched with a positive judgment of that success. Other times, it may be desired to have a very negative feel to the outcome by matching failure with a negative judgment of that failure. In the first case, we create a "feel good" story, as they say in the ads. In the second, we create a tragedy. But all stories do not fall at one pole or the other. Frequently, authors choose to have "bad" characters succeed, and show the regrettable result of that success, or to have "good" characters fail, but show how that failure was really positive for them or others. When deciding if you want Character to succeed, think not only of the stories where the winner takes all, but of those stories where a valiant effort fails, yet the Characters learn an important lesson about life. When deciding if you want the Characters to fail, think not only of someone getting their just deserts, but of those stories where a misguided success leads to a result opposite what the Characters had hoped to achieve by the success.

In short, either success or failure can be seen as an "upper" or a "downer" by the audience, and the approach you take to the message should consider that.

Impact: Achieving something requires accomplishing the right steps in the right order to get from where the Characters start to where they want to be. When you choose success or failure, the invention alters the kind of steps the Character will need to take, and determines the appropriate order to bring them to the desired outcome.

Judgment: Good or Bad?

Topic: Even though the effort to achieve the story's goal may result in success, this is not necessarily a good thing for the Main Character. In fact, success might be obtained in the objective story even though the Main Character fails to resolve their personal problems. Similarly, the effort to achieve the story goal might end in failure, yet the Main Character ends up overcoming their personal problems. Just as Success and Failure evaluate the positive or negative nature of the objective story's outcome, Good and Bad indicate whether or not the Main Character resolves their personal problems.

Background: The notion that the good guys win and the bad guys lose is not always true. In stories, as in lifer we often see very bad people doing very well for themselves (if not for others). And even more often, we see very good people striking out. If we only judged things by success and failure, it wouldn't matter if the outcome was good or bad, as long as it was accomplished. The choice of Good or Bad, places the author's moralistic judgment on the value of the Main Character's success or failure in resolving their personal problems. It is an opportunity not only to address good guys that win and bad guys that fail, as well as good guys that fail and the bad guys that win, but to comment on the success or failure of their growth as human beings.

Storytelling Usage: The rational argument of a story deals with practicality: does the kind of approach taken lead to success or failure in the endeavor. In contrast, the passionate argument of a story deals with fulfillment: does the Main Character find peace at the end of their journey? If you want an "upper" story, you will want success in the objective story and a judgment of "good" in the objective story. If you want a tragedy, you will want the objective effort to fail, and the subjective journey to end badly as well. However, life is often made of trade-offs, compromises, sacrifices, and re-evaluations, and so should be stories. Choosing Success/Bad stories or Failure/Good stories opens the door to all these alternatives. If we choose a Failure/Good story, we can imagine a Main Character who realizes they had been fooled into trying to achieve a goal, or a Main Character who discovers something more important to them personally in the course of trying to achieve the goal. A Success/Bad story might end with a Main Character achieving their dreams only to find they are meaningless, or Main Character who makes a sacrifice for the success of others but ends up bitter and vindictive.

Impact: Because success & failure are measurements of how well specific requirements have been met, they are by nature Objective. In contrast, Good and Bad are Subjective value judgments based on an appreciation of the Main Character's peace and fulfillment. When you select Good or Bad, the invention adjusts the "phasing" between the Objective and Subjective storylines to create an interference pattern that support the appropriate value judgment.

The Objective Story

Objective Story Domains: Which Class?

Topic: Every story is built around the difficulties created by something that is out of balance. There are four broad areas that define the "classes" of inequities that can occur. These are described by the four Domains.

Background: An author cannot successfully make an argument promoting a solution until she has identified the problem. In stories, problems can be identified as falling into four broad categories: Situations, Activities, States of Mind, and Manners of Thinking. These categories are named by the four Domains, Universe (a situation), Physics (an activity), Mind (a state of mind) and Psychology (a manner of thinking). Universe represents an External State, Physics an External Process. Mind is an Internal State and Psychology an Internal Process. Since they are related, all four of these Domains will figure in every story as the problem works its influence into all areas of consideration. However, only one Domain will ultimately prove to be both the source of the problem's roots and therefore the place it must ultimately be solved.

Storytelling Usage: By choosing the Domain, the author sets the background against which the story will be told. Therefore, its influence is gently felt throughout the story. A Universe story deals with an unacceptable situation—one in which the external environment is seen as problematic. This could be a job situation with poor working conditions, being trapped in a sunken ship, waking up as someone else, living next to an orphanage that keeps you awake at night with its screaming waifs or any other intolerable state of affairs. A Physics story employs an activity that needs to arrive at a solution. This might be the effort to steal the crown Jewels, win the love of the heart's desire, make the Olympic team, or raise the money to buy the orphanage and evict all the screaming waifs. Note that if the existence of the orphanage is the focus of the story, it is a Universe (situation) Domain. However, if the effort to buy it is the focus, it is a Physics (activity) Domain. In a like manner, Mind Domain reflects a state of mind and Psychology Domain describes a mental activity (or manner of thinking). Mind Domain stories might be about prejudice, a lack of self-worth (if it is a fixed view), or a refusal to see the value of someone's desires. Psychology Domain supports stories where one takes too many risks, is egocentric, or makes light of serious situations.

As a final note, it is important to keep in mind that stories are often not about a problem that exists but a desire to be fulfilled. Stories of this nature can create a much more positive feel as exemplified in a Universe story in which an heiress must spend a million dollars in 24 hours to inherit 30 million more, a Physics story where a mountaineer hopes to be the first to scale a mountain on Mars, a Mind story of unconditional love, or a Psychology story about overcoming a dependence on sedatives.

Impact: The choice of Domain narrows the playing field of a story. Without actually putting up walls, choosing a Domain shifts the focus of audience attention by establishing the center around which broad scale dynamics will revolve. The invention engine is calibrated to this center.

Objective Story Concerns: Which Type?

Topic: The story's concern describes the area in which the effects of the problem are principally felt. By defining the nature of what must be "fixed," the concern represents the goal or purpose sought in the story.

Background: Problems can manifest themselves in several ways. Therefore, simply defining the nature of a problem does not necessarily predict its effect. For example, if the problem is not enough money to pay the rent, it might motivate one person to take to drink but another to take a second job. The effects of a problem are not necessarily bad things, but simply things that would not have happened quite that way without the existence of the problem. So it is with Concerns. The choice of Concern determines the principal area affected by the story's problem and serves as a broad indicator of what the story is about.

Storytelling Usage: The Concern of a story tends to revolve around a definable area of activity or exploration. This central hub may be internal such as Memory or Conceiving (coming up with an idea). Or, it may be external such as Obtaining or Progress. When choosing a Concern it is often useful to ask, "Which of these items is what I want the characters in my story to examine?" Keep in mind that the Concern only describes WHAT is being looked at. HOW to look at it is determined by choosing the Range. Impact: The choice of Concern sets limits on how much dramatic ground the Theme can potentially encompass and therefore includes some kinds of considerations and excludes others.

Objective Story Ranges: Which Variation?

Topic: An author must not only choose the nature of the problem in her story, but also in what light she wishes to present it. The choice of Range determines the yardstick by which the audience will be urged to measure the problem.

Background: In stories, it is not only important what you wish the audience to look at but also in what light you want them to see it. The point of view from which the audience evaluates the meaning of the story is crucial to supporting the conclusion to a given argument. Range helps select a filter through which the author can control the shading of the events that unfold.

In a sense, Range provides the audience with a yardstick and tells them, "measure what you see to this scale."

Storytelling Usage: For any given issue there can be many points of view. To make a successful argument an author must address them all, yet select one as the standard perspective. If an author wishes to explore a concept rather than argue it, she must still touch all perspectives and select one as the view from which all the others are measured. If this yardstick is not provided, the audience is free to judge anything from any point of view and will simply adopt the one they are familiar with out of habit. As a result, they will gain no new understanding and the story will have no purpose other than to reiterate what the audience already knew. Conversely, if an author wishes to make a point or deliver a message or even document the similarities and differences between dramatic incidents, then the events of the story must be measured against something. Choosing the Range tells an audience by what standard the author intends them to evaluate what they experience in the story.

Impact: By placing the story's problem in context, the choice of Range determines the thematic progression that supports that desired point of view on the events in the story.

Objective Story Problem: Which Element?

Topic: At the heart of every story is an item that is out of balance with its surroundings. Choosing the story's Problem defines the nature of that imbalance.

Background: When everything in a potential story is in harmony, there is no conflict, no message, no progression. It is like a deck of cards sitting solidly on a table. However, if we use that deck to build a house of cards, we have created potential. No matter how well we construct it, gravity is always waiting to pull it down beginning at the first weak point that occurs. The invention Engine is like the deck of cards. When we answer the first eight Essential Questions, we build a card house of dramatics. Still, it is balanced, although potential exists. The choice of Domain, Concern and Range establish weaknesses in the structure. The choice of Problem picks the card that starts to buckle threatening to bring the whole house down.

Storytelling Usage: Problems are at the heart of a story's troubles. Sometimes a problem is shown as the central cause of a number of troubles. Other times problems are shown as the imbalance that triggers a domino effect. If a number of seemingly unrelated items all go sour, the common connection will turn out to be the problem. If a chain of events results in disaster, the problem can be seen as the force that started it all. When telling a story, an author has a choice of focusing on the problem or its effects. In the first case, where the problem is at the center of troubles, the storytelling might begin with the problem and then show how its ripples impact everything they touch as they grow around it. Conversely, the storytelling might first explore the seemingly unrelated troubles, slowly spiraling in on the source, which is only discovered at the end. In a more linear story, an author might begin with the problem and follow its impact step by step to its ultimate effect. Or, working backwards, the author might begin at the effect, and trace its roots back until the original problem is identified.

Impact: Once the story's problem is chosen, the invention Engine arranges all the other dramatic choices the author has made around the problem so the story's dynamics are both dependent upon it, and derivative of it.

Objective Story Goal: Which Type?

Topic: Traditionally, Goal has been seen as the specific item the characters in a story are hoping to achieve the invention is more interested in the kind of goal than the goal itself. Choosing the Objective Story Goal determines the Purpose to which the characters aspire, rather than the particular achievement they hope will meet that Purpose.

Background: Some stories have a single item everyone in the story is trying to achieve, such as obtaining a priceless diamond. Other stories have the characters all seeking different goals, but of the same type, such as becoming content in their various intimate relationships. In the first example, the invention Goal would be Obtaining. In the second example, the invention Goal would be Becoming. In both cases, everyone is concerned with the same Purpose to which they aspire, even though they are all after the same diamond but are involved in different relationships. This allows an author to explore the different approaches that can be taken in the effort to arrive at the same purpose and argue the point that some are appropriate and others are not.

Storytelling Usage: Some stories have a single item everyone in the story is trying to achieve, such as obtaining a priceless diamond. Other stories have the characters all seeking different goals, but of the same type, such as becoming content in their various intimate relationships. In the first example, the invention Goal would be Obtaining. In the second example, the invention Goal would be Becoming. In both cases, everyone is concerned with the same Purpose to which they aspire, even though they are all after the same diamond but are involved in different relationships. This allows an author to explore the different approaches that can be taken in the effort to arrive at the same purpose and argue the point that some are appropriate and others are not.

Impact: The Choice of Goal picks a focal point in the plot around which the order and nature of events must revolve.

The invention engine applies the story's dynamics to this focal point in order to determine an appropriate Consequence should the Goal fail to be achieved, appropriate Requirements necessary to achieve the Goal and a number of other related dramatic Appreciations.

Objective Story Dividend: Which Type?

Topic: On the path toward achieving the goal, unexpected items or perks are collected that make the effort itself worthwhile, independent of the Goal.

Background: Each obstacle that is overcome on the way toward the Goal illustrates another aspect of the problem and the "proper" or "improper" means of solving it. However, the Costs incurred in the endeavor would quickly deplete the characters' resolve to the point that the Goal was no longer worth the effort. To motivate the characters toward the goal, the Costs must be balanced by Dividends that either undo the negative effects of the Costs or have benefits elsewhere that make the price acceptable.

Storytelling Usage: Renegades trying to escape to the Badlands may come across a farmer's daughter to rape. Joan of Arc, on her way to be burned at the stake may see the clouds part and rays of sunshine beckon to her. Depending upon the characters and their Goal, certain items, events or experiences will occur that make the journey more worthwhile. If it were not for these Dividends the arduous endeavor would become too Costly to warrant continuing. Characters do not simply add up the Costs, but they average them with the Dividends to determine the overall propriety in continuing on their quest. Dividends do not need to be tangible, but may be personally fulfilling such as visiting a foreign city, helping a child to read or the opportunity to get the personal dossiers of co-employees one is romantically interested in. If we look at the effort to achieve the goal as going to work to get a paycheck, then the Costs of having to live by the rules under someone else's authority might be balanced out by the personal friendships one has established. Then it comes back to a choice between staying on and achieving the Goal of a paycheck or quitting and facing the Consequence of a foreclosure. That is the purpose of Dividends: to balance out the Costs so that it all comes back to a decision regarding the Goal vs. the Consequence.

Impact: Choosing the Dividend determines the category of benefit that the characters will accrue on the way toward the Goal. Dividend helps to select comparable Costs and limits the choices of appropriate Goal and Consequence.

Objective Story Cost: Which Type?

Topic: During the attempt to achieve the story's Goal there is a price that must be paid. Cost determines the nature of the negatives attached to the effort.

Background: There's no such thing as a free lunch. There's also no such thing as achieving a Goal without paying a price. Every Goal is separated from instant achievement by a number of obstacles. If it were not so, a story would end as soon as it began. For each obstacle that must be overcome, effort must be expended. This results in a net loss to the character, who hopes to more than justify the expense by achieving the Goal. The kind of Cost incurred in a given story depends upon the nature of the Goal and the Requirements for its achievement.

Storytelling Usage: Cost describes the area in which negative impact is felt as a result of the effort to overcome obstacles on the way to the Goal. This is not unlike a Role Playing game where the Warrior loses "life points" or expends "magic" as she does battle with the evil elves. Fighting demons takes its toll, and so does trying to get an "A" in math. Whatever the Goal, there are certain steps that must be taken or obstacles that must be surmounted. Each effort made will deplete the reserves of the character or negatively impact the character in obscure ways that make them question the worth of continuing on the journey. This is as true of the effort to save a marriage as it is of the struggle to blow up the Orange Claw's munitions dump. The toll adds up, the cost begins to come close to outweighing the benefits of achieving the Goal. In fact, it may even appear prudent to cut one's losses and accept the Consequences, rather than continue to throw good effort after bad. This is how the tension builds that makes a Main Character's leap of faith so powerful. At the moment of climax, the Cost balances out the Goal and there is no clear right or wrong of it. It's just a throw of the dice for the character as to whether it's better to hold on to the end or toss in the towel. Some stories slowly build the Cost so that it reaches that balance gradually. This makes the character feel as if the weight dragging them back is slowing increasing until they are dead in the water. Other stories keep the costs low and balance it out right before the climax with one huge cost that must be paid all at once. Again, this is a matter of intensity and completely open to manipulation. However, the kind of Cost incurred is dependent upon Goal, Consequence, and Requirements, so that it might fully illustrate the debits against the Story Mind as it grapples with a particular nature of problem.

Impact: There is an attrition that will occur in all interactions in a story, even if they are minor events. A choice of Cost determines the nature of this drain, and therefore impacts both Plot and Theme as well.

Objective Story Consequence: Which Type?

Topic: The Consequence describes the negative aspects of a failure to achieve the Goal.

Background: Every Silver Lining has a cloud around it. The Silver Lining is the Goal, the cloud is the Consequence. There is no reason to strive for a Goal unless failure to achieve it has negative Consequences. Sometimes the Consequences are relatively minor, such as having to do extra chores or just the disappointment of not getting the ice cream. But, of course, Consequences can range all the way up to unthinkable horrors. The Intensity of the Consequence modulates the importance of the goal, but is completely arbitrary as long as the Consequence is appropriate to the Goal. Since they are both parts of the same Silver Lined Cloud, Goal and Consequence are intimately related to each other by story dynamics (even if the Silver Lining is on the outside and the Cloud is hiding in the middle).

Storytelling Usage: Often the Consequence is seen as something bad that will happen if the Goal is not achieved. However, it is just as functional to have a negative situation already existing that the characters hope to stop by achieving the Goal. In fact, if a villain is the Main Character, the Goal may be the negative item and the Consequence positive, as in "How The Grinch Stole Christmas." Goal, therefore does not have to be good and the Consequence does not have to be bad. Rather, Consequence is the alternative to what will happen if the Goal is not achieved. Goal, therefore is a state of things that does not yet exist. It is Purpose of the plot. It is what all the effort is trying to achieve. But WHY? Because of what will happen if it is not achieved: the Consequence. The wider the gap between the alternatives, the greater the dramatic tension. Still, intense dramatic tension is not always to be desired. In a story intended to be a playful romp, the discrepancy between Goal and Consequence might be intentionally kept to a minimum. This way, although there is not much to gain, there is also not much to lose and everyone is still friends at the end. In the opposite extreme, simply selecting death as a Consequence fails to describe how that relates to whatever the Goal is. What does that death mean? Is it a failure to Learn that resulted in death? A failure to truly Become something? In respect to Goal, the invention is concerned with the Purpose of the plot. In respect to Consequence, the invention is concerned with how the plot should be Evaluated. What does it mean to achieve the Goal? What does it mean to fail. This context is provided by the selection of Consequence.

Impact: The choice of Consequence helps select the appropriate category of Goal, Requirement, and Forewarning in the context of a story's dynamics.

The Main Character

Identifying the Main Character

Topic: The Main Character is not necessarily the Protagonist of a story. While the Protagonist may be the prime mover of the Objective Story, the Main Character is the focus of the Subjective Story. Choosing the Main Character determines through whom the audience will experience the feel of the story.

Background: Every story provides the audience with an Objective view OF the struggle to resolve the story's problems and a Subjective view FROM INSIDE the struggle itself. The Objective view forms a dispassionate argument, where the audience observes and analyzes the effects of the characters' different approaches and motivations. It is this Objective view that speaks to the intellect. In contrast, the Subjective view speaks to the heart. It provides an audience with the experience of feeling the story as if it were happening to them. This view is provided through the eyes of the Main Character. Sometimes an author will assign the role of Main Character to a Protagonist, which creates the commonly understood "hero." However, it is just as appropriate to assign this most personal viewpoint to any other character is a story instead. In this manner, the intellect and the heart can take different view of the story's problem and even arrive at different conclusions. Bitter-sweet stories, child's-eye views, and stories of self-sacrifice are easily told when the Main Character stands near the side of the effort to achieve the goal, rather than right in the heart of the fray.

Storytelling Usage: A Protagonist is an objective archetype. This means that they play a role in the Objective (dispassionate) argument of the story and also that they represent a very specific arrangement of characteristics. Because they contain all the elements needed to build a fully functional character, archetypal Protagonists are an efficient way to illustrate the effect of the characteristics they represent. In fact, there are eight archetypes that represent a total of 64 different elements. However, archetypes are but one way to illustrate those qualities. The individual elements can be swapped between archetypes or spread among several. Archetypes can be broken up and reassembled. Characters can even be built from the ground up assembling the elements in many different arrangements.

All this goes on independently of who the Main Character is. The Main Character does not represent a function, but rather a point of view. It is through the Main Character's eyes that the audience experiences what it would be like if the story's problems happened to them. In real life we may be at the heart of the effort to resolve various problems, near the edge, or only peripherally involved in the effort, even though we are aware of and affected by it. It is the same with stories. By selecting any one of the objective characters (archetype or not) as the Main Character, you can select the angle from which the audience will experience the story at a personal level. And, if you really want, you can even make the Main Character the Protagonist!

Impact: Choosing a Main Character is perhaps the most important decision in storyforming. When you determine the angle from which the audience will experience the story, the invention winds up all the dramatic potentials around that axis. The Choice of Main Character affects all levels and natures of what will follow. Still, all we ask here is for their name. But before you answer, think about how the decision will effect the direction from which the audience will experience the story.

Main Character Domains: Which Class?

Topic: This choice determines the nature of what drives the Main Character. For example, they might be driven by an attitude they need to change or by a conviction they need to maintain. Either way, their drive has a source. There are four areas in which drive can be created. These are represented by the four Domains.

Background: Without drive, there is no force to propel the Main Character through the story. Just putting the character in a tough or unpleasant situation is not enough unless they have the motivation to do something about it. This internal drive is one of the focal points of a story's dynamics, and is therefore an important consideration. Choosing the Main Character Domain selects the overall nature of what is driving the Main Character. In the invention, there are four Domains in the Storyform: Universe, Mind, Physics and Psychology. A Universe Domain Main Character is one with a steady body state. We see this kind of character in "The Elephant Man," "My Left Foot," "Ghost" or "Dumbo." In the Mind Domain, the Main Character has a fixed attitude such as a prejudice or a refusal to accept something as in "Unforgiven," "Aladdin" and "A Christmas Carol." A Physics Domain Main Character is physically active, such as in "Rambo : First Blood," "Flashdance" or "Robin Hood." The Psychology Main Character struggles with a manner of thinking, as seen in "The Prince of Tides," "The World According to Garp" and "Howard's End."

Storytelling Usage: Because the Main Character stands at the root of both the Objective and Subjective problems, choosing the Main Character's Domain has a huge impact on the relationship between the two problems, and therefore on the feel of the story as a whole. Of the four Domains, Universe and Physics describe External problems whereas Mind and Psychology illustrate Internal problems. As a result, the Objective Story Domain and the Main Character Domain might be in the same general area or on opposite sides of the tracks. When both Domains are either Internal or External we say they are a Companion Pair. Stories with External Companion Domains tend to focus on action since the dissonance (conflict) created in the story is between an external state (Universe) and an external process (Physics). Similarly, stories with Internal Companion Domains tend to focus on deliberation since the dissonance is between an internal state (Mind) and an internal process (Psychology). In contrast, stories where one Domain is External and the other Internal strike more of a balance between action and deliberation. As a result of this division, the progress of the story depends on the shifting balance between Internal and External forces. This is why Internal/External pairings of Objective Story Domain and Main Character Domain are called Dependent Pairs. In Companion Pair stories, the Main Character is dealing with the issues on their own turf. In Dependent Pair stories, the Main Character is something of a fish out of water, trying to deal with difficulties they are not really equipped to handle, such as "Romancing the Stone" and "Three Men and a Baby." When choosing the Main Character Domain, keep in mind the choice for Objective Story Domain in order to create the feel you want in the story's dissonance.

Impact: The choice of Main Character Domain not only determines something about the Main Character's personal drive but in conjunction with the choice of Objective Story Domain and other Essential Questions creates patterns for the dissonance and conflict that will occur as the story progresses.

Main Character Ranges: Which Variation?

Topic: Judgmental appreciations made by the Main Character in the course of a story are described by their Range or Thematic Focus.

Background: Main Characters are not only concerned with problem solving or dealing with difficulties, but also have a point of view toward the world around them. This point of view is described by their Thematic Focus. Unlike the Objective Story Thematic Focus, the Main Character is not judging from the perspective of Universal Truth but as a discovery of Personal Truth.

Storytelling Usage: In order to make an Objective Thematic statement, the case for an inequity must be made consistently. However, this tends to create a heavy-handed message that is likely to appear one-sided and obvious. Fortunately, an opportunity exists to temper this message through the Main Character's Thematic Focus. In the midst of a battlefield our Main Character notices a single flower growing up through the rubble. At the frenetic High School dance, a girl sits all alone, unnoticed. How can she be unnoticed if we noticed her? Because "objectively" no one sees her—they are "all" concerned with dancing. But the Main Character looks across the room and observes the discrepancy. In both these cases, the Objective Theme is the initial condition which is then "shaded" in light of the Main Character's Theme. Conversely, the Main Character might be walking down the street, self-consciously trying to hide a zit on the tip of their nose, when they turn a corner just in time to see the "Burn Victim Support Group" marching in a parade. In this case, the Main Character's Theme is the initial condition, which is modulated by the Objective Theme. Because these kinds of contrasts and/or reinforcements offer such fertile material for storytelling, authors often employ these techniques in a random fashion, hoping to move the audience. Unfortunately, without a pattern to these counterpoints, after a while they begin to bog down a story since they do not truly advance it. By choosing the Main Character's Thematic Focus, one is able to select a central topic that serves to unify these Personal Truths into a bonded statement.

Impact: The choice of Main Character's Thematic Focus selects the central hub around which the Subjective Thematic progression will revolve. Other dynamics determine the direction and meaning of this progression, creating a map of Thematic Sequences that allow an author to make personal commentaries that support the overall message of a story.

Main Character Problem: Which Element?

Topic: This choice determines the nature of what is behind the Main Character's drive. For example, the Main Character might be driven to do or be something, but why? The Main Character's problem is not necessarily a bad thing. In fact, it is the source of their motivation and therefore represents the part of themselves that is dissatisfied with their lot.

Background: Without motivation—without a problem—there is no inequity that spurs the Main Character to better their lot. Sometimes it may seem that problems exist in our environment. Other times, we may perceive a problem with ourselves: the way we act or feel. In truth, problems really exist between ourselves and our environment as an inequity between the two. As example, we may hang on to our desires, even though it causes trouble around us. Conversely, a whole situation might be faltering because of one stubborn individual. These are really two ways of looking at the same inequity. One casts the problem in the environment, the other places it in the person. So when we look at the Main Character's Problem, we are really looking at the inequity of the story at large as it is reflected in the Main Character.

Storytelling Usage: The term Main Character's "problem" is something of a misnomer. Even though the problem is what is "wrong" with the Main Character according to the outside world, if the Main Character is actually correct in their motives and the world at large is mistaken, then this "problem" is what drives the Main Character to set things right. Of course, they might fail in the attempt, but their heart is in the right place. On the other hand, the Main Character might be mistaken, and their problem is just that: the source of all the story's difficulties. So, there are really two ways to look at the Main Character's problem. Which is right for the story? That is determined by the answers to two of the 12 Essential Questions: Success/Failure and Good/Bad. For the Success/Good and Failure/Bad combinations, the Main Character was on the right track, according to the author. In the first case, it paid off and that was good. In the second it didn't pay off and that was bad. The value judgment of Good/Bad tempers Success or Failure and in these two cases tells us that the Main Character's Problem was really best seen as the source of their drive to set things right. However, in the Success/Bad and Failure/Good stories, the author's message is that the Main Character was actually the cause of everyone's problems and therefore, what drove them was really the source of the inequity. In this case, the Main Character Problem really IS a problem, and needed to be solved. Whether it was or not is determined by Success/Failure. These examples illustrate how the meaning of Main Character Problem changes under different dynamic conditions. Therefore, when answering this question, it helps to know in what dynamic context you want the Main Character to be operating.

Impact: The choice of Main Character Problem selects the single point around which the web of the entire Subjective Story is woven.

Main Character Solution: Which Element?

Topic: This choice determines what is truly needed to satisfy the Main Character.

Background: For every Motivation there is a complementary element of Satisfaction that restores a sense of equity and contentment. The Main Character's Solution is this element. If the Main Character were to possess this Solution, their Motivation would wane and their drive disperse. In fact, this is what a Main Character hopes to achieve by the end of the story: a satisfaction that complements their original Motivation, solving their problem and allowing them to hang up their guns and go home.

Storytelling Usage: A Main Character's Problem may be the real source of a story's difficulties or may actually be just the source of the Main Character's drive to set things right. As a result, its complementary Solution might be just what the doctor ordered or an Achilles' heel that would satisfy the Main Character into letting the real problem lie. Do you see the Main Character as having the problem or solving the problem? If they have the problem, then arriving at the Main Character's solution is what the story is all about. But if they are solving the problem, the Main Character's Solution is the one thing they must avoid at all costs.

Impact: The choice of Main Character's Solution establishes a second "pole" in the dynamics that drive the Main Character, creating dramatic flow between the need that drives them and the quality that will quell that need.

Main Character Focus: Which Element?

Topic: A Main Character only deals directly with the story's problem at the climax. Until that point, they are wholly occupied dealing with the effects of the problem. The Main Character's Focus determines the nature of these effects.

Background: Problems are the source of a story's difficulties, but the difficulties themselves are where the attention is focused. In stories where the Main Character is really the culprit because of some character flaw, it takes them the whole story to stop battling all the effects of their destructiveness and realize all their troubles have a common thread. In stories where the Main Character is on the right track, their attention is distracted by all the immediate obstacles created by the problem. Only at the end climax have they cleared their way through the mine field enough to address the central issue. In both of these examples, the story's difficulties are where the Main Character's attention is drawn, which is described as the Main Character's Focus.

Storytelling Usage: Every disease has its symptoms. Story problems operate the same way. Depending upon the nature of the disease and what particular strain is in question, the symptoms may vary widely. In fact, symptoms may vary between individuals. When we choose Main Character Domain, we are saying something about the individual. When we choose Main Character Focus, we are directly selecting the symptoms. The kinds of things the Main Character talks about will center on their Focus. This topic will be at the forefront of their thoughts and actions. If left to their own devices, their conversation will always drift back toward this Focus, as it is their area of greatest attention. Quite simply, it is where the Main Character believes the problem to be. Now, in a Main Character who is actually the real problem themselves, they will not see it, though most everyone else may. How can they be so blind? Because they are focusing all of their attention elsewhere. They have a completely developed alternate explanation of what is behind the story's difficulties and feel that entertaining an alternative is a temptation to veer from the correct path. They aren't stupid, just pre-occupied. In the case of a Main Character who is NOT the problem, but is trying to solve the problem, then the focus really IS where they ought to be looking, and veering from that course WOULD be a temptation that could lead to disaster. The key to having an audience accept a misguided Main Character's apparent refusal to see themselves as the cause of the troubles or a Main Character on the right track who never questions their own motivations, is to give them something else to Focus on.

Impact: Selecting Main Character's Focus determines the way in which the difficulties in a story will affect them.

Main Character Direction: Which Element?

Topic: Before a Main Character can address a story's problem directly, they must first get through the difficulties created by that problem. Main Character's Direction determines how the Main Character tries to approach the problem.

Background: Getting to the heart of the story's problem is much like negotiating a maze. The problem generates a myriad of difficulties that obscure its true nature and hinder any attempt to deal with it directly. The Main Character's Direction is something of a battle plan. It describes the tack by which the Main Character hopes to thwart the difficulties and arrive at the seat of the problem itself.

Storytelling Usage: When a Main Character is on the right track, they are headed in the right Direction. But when a Main Character is really the cause of a story's troubles, they are headed in the wrong Direction. The things that they do and the things that they consider are responses that all grow out of where they believe the real problem to be. They look at their troubles, then determine what they think is behind them. This becomes their Focus. Accepting this Focus as a given, the best Direction of their efforts becomes clear. So, when they are correct in identifying the problem, they hack away until it appear before them. But when they are incorrect, they may beat all round the issue and miss it entirely. As Focus suggests what a Main Character is likely to fixate on, so Direction determines how they are likely to respond.

Impact: Choosing the Main Character's Direction, sets the course for the kind of effort they will make in their quest for a solution to their troubles.

Main Character Unique Ability: Which Variation?

Topic: The attribute attached to the Main Character that makes them uniquely qualified to solve both the Objective and Subjective Problems is described by their Unique Ability.

Background: Every Main Character has a special strength, even if they are not aware of it themselves. Without such a strength, there would be no compelling reason why the story revolved around this particular character as Main instead of any other. With a Unique Ability, the Main Character becomes an essential participant in the story, as well as holding the ultimate key to resolving the story's difficulties.

Storytelling Usage: In order to make an Objective Thematic statement, the case for an inequity must be made consistently. However, this tends to create a heavy-handed message that is likely to appear one-sided and obvious. Fortunately, an opportunity exists to temper this message through the Main Character's Thematic Focus. In the midst of a battlefield our Main Character notices a single flower growing up through the rubble. At the frenetic High School dance, a girl sits all alone, unnoticed. How can she be unnoticed if we noticed her? Because "objectively" no one sees her—they are "all" concerned with dancing. But the Main Character looks across the room and observes the discrepancy. In both these cases, the Objective Theme is the initial condition which is then "shaded" in light of the Main Character's Theme. Conversely, the Main Character might be walking down the street, self-consciously trying to hide a zit on the tip of their nose, when they turn a corner just in time to see the "Burn Victim Support Group" marching in a parade. In this case, the Main Character's Theme is the initial condition, which is modulated by the Objective Theme. Because these kinds of contrasts and/or reinforcements offer such fertile material for storytelling, authors often employ these techniques in a random fashion, hoping to move the audience. Unfortunately, without a pattern to these counterpoints, after a while they begin to bog down a story since they do not truly advance it. By choosing the Main Character's Thematic Focus, one is able to select a central topic that serves to unify these Personal Truths into a bonded statement.

Impact: Main Character Unique Ability is related to both the story's Problem and the Thematic Focus. Once selected, it establishes a Range in which certain story dynamics may operate.

Main Character Critical Flaw: Which Variation?

Topic: A Main Character could employ their Unique Ability to resolve the story as soon as it began if it were not for a Critical Flaw that hamstrings its use.

Background: Like each of us, Main Characters have attributes that are assets and those that are detractors in our efforts to achieve our purposes. Part of resolving our difficulties is to learn to hold our negative attributes in check when they would be harmful. For Main Characters, a story concentrates on one essential Unique Ability that has the potential to resolve the story's difficulties and the Critical Flaw that prevents its effective employment.

Storytelling Usage: A Main Character's Critical Flaw might prevent them from using their Unique Ability or might come into play afterward, undercutting the effectiveness they had just achieved. This has a relationship to the Essential Question that describes the Main Character as needing to grow either by Starting something they haven't been doing or Stopping something they have. If the Critical Flaw prevents the employment of their Unique Ability, they must learn to Start employing their Unique Ability. If the Critical Flaw undoes the work of their Unique Ability, then they must Stop doing that! Either way, the Main Character must learn to overcome their Critical Flaw if they are to ultimately achieve their purpose. We are all familiar with stories where we find ourselves saying, "If you'd just take that step everything would be okay." This is a Start, story in conjunction with a Critical Flaw. The Main Character is inhibited from making the efforts we feel they should. And yet, as frustrating as this is, we accept it because the Critical Flaw has been established as a roadblock they cannot pass and must first grow enough to remove it. When a Main Character lacks a Critical Flaw there is no reason provided as to why they cannot act or decide and therefore they appear ignorant or stupid, leading us to proclaim, "Why didn't they just . . . ? It's so obvious!" In a Stop story, the Main Character's Critical Flaw scuttles their own efforts. In these stories we find ourselves thinking, "Okay, everything is going to work out . . . just don't mess it up . . . " That is where the Main Character gets the urge to sneeze and blows the window display over or stops to tie their shoe and trips someone into the wedding cake. Without a consistent Critical Flaw, all these mishaps would appear coincidental, rather than a direct result of the Main Character's need for growth. Each act, a Main Character is faced with an opportunity to resolve a story's difficulties in a single master stroke. It is the Critical Flaw caused by their own need for growth that inhibits or undercuts that effort until they grow enough to address the source of their drive in the Moment of Truth at the climax.

Impact: Choosing a Critical Flaw establishes detractors from the Main Character's efforts that are used to illustrate their personal growth.

Main Character

The Obstacle Character

Topic: When an audience looks through the eyes of the Main Character, they see the Obstacle Character standing squarely in their path. The Obstacle Character provides constant resistance to the direction the Main Character tries to take in the effort to resolve their personal problems.

Background: For every notion there is a Pro and a Con. For every plan there are those for it and against it. In the Objective Story these roles are filled by a Protagonist and Antagonist. In the Subjective Story they are filled by the Main and Obstacle Characters. In the Objective Story we watch a Protagonist do battle with an Antagonist as if we were bystanders observing a fight or an argument. But in the Subjective Story, we look through the eyes of the Main Character and see the Obstacle Character in our face. It is as if we had actually become one of the conflicting parties and were sizing up the opposition. Often, and author will elect to make a Protagonist also the Main Character. However, this does not have to be the case. The Main Character can be any of the objective characters, even if they are not central to the conflict of the story. This can provide an audience with all the different relationships to a various problems that we experience in real life. It also goes a long way to determining who would appear to be the biggest obstacle to our personal agenda, as the Main Character. Just as the Objective Story involves disagreements about the best way to achieve the goal, the Subjective Story involves disagreements about the best way to resolve the Main Character's personal problems. Sometimes, the Main Character is right in their approach and must simply develop the resolve to stick it out against the Obstacle Character's opposing opinions until the end. Other times, the Main Character is misguided and will only find personal fulfillment if the Obstacle Character can convince them of the error of their ways. In either case, the Obstacle Character might be a friend or a foe, as they themselves may or may not be misguided. The only sure thing is that whatever approach the Main Character takes, the Obstacle Character will be blocking it.

Storytelling Usage: Perhaps the most simple way to populate a story is to create the eight perfectly balanced archetypal characters. Two of these characters are the Protagonist and the Antagonist. The archetypal Protagonist is for the goal, the archetypal Antagonist is against it. Next, just assign the role of Main Character to the Protagonist and the role of Obstacle Character to the Antagonist. You have now created a story in which the audience sees through the eyes of the character who is the prime mover in the attempt to achieve the goal and the prime obstacle in the path to both achieving the goal and resolving their personal problems is the Obstacle Character/Antagonist. Now that we've gotten THAT out of our systems, lets see how creative we can be. How about a story where the ANTAGONIST is the Main Character and the PROTAGONIST is the Obstacle? Suddenly we look through the eyes of the character opposed to the goal and we are trying to stop them from succeeding. In addition, this rather forward person is messing up our effort to arrive at personal fulfillment as well. Get more creative. How about a love triangle, where the Main Character is the Protagonist, the Obstacle Character is their spouse, and the Antagonist is their boss. Suddenly we see an Objective Story and s Subjective Story. In the Objective Story the Protagonist must work late or risk losing their job. In the Objective Story their spouse threatens to leave if they don't get more attention. One plays to the intellect, the other to the heart. One blocks the path to satisfaction, the other to fulfillment. Any objective character can be chosen to carry an additional banner as the Obstacle Character. By making the selection as to who that should be, you set up a lot of the dramatic framework that will determine the kinds of pressure and decisions the Main Character will face.

Impact: Selecting the Obstacle Character establishes a relationship between the Objective Story and the Subjective Story that will effect the side of the storyform that will be most exposed to the audience through the storytelling.

The following Table summarizes the appreciations used in the preferred embodiment of the invention.

| CHARACTER DYNAMICS APPRECIATIONS: | |
|---|---|
| Change or Steadfast | Which best describes what the Main Character decides? |
| Do-er or Be-er | Which best describes the Main Character's approach? |
| Stop or Start | Which best describes how the Main Character needs to grow? |
| Mental Sex | What is the Main Character's Mental Sex? |

-continued

| PLOT DYNAMICS APPRECIATIONS: | | |
|---|---|---|
| Action or Decision | | Which best describes the feel of the story? |
| Timelock or Optionlock | | What is the type of limit that brings the story to a resolution? |
| Success or Failure | | Which best describes how the efforts in the story resolve? |
| Good or Bad | | What is the story's outcome shown to be? |
| OBJECTIVE STORY APPRECIATIONS | | |
| Obj. Story Domain | C | Locate the domain in which the objective story takes place |
| Obj. Story Concern | T | Locate the area of concern in the objective story |
| Obj. Story Range | V | Locate the objective story's thematic focus |
| Obj. Story Problem | E | Locate the source of the objective story's problems |
| Obj. Story Solution | E | Locate the solution to the objective story's problems |
| Obj. Story Focus | E | Locate where attention is focused in the objective story |
| Obj. Story Direction | E | Locate the direction of efforts in the objective story |
| Obj. Story Catalyst | V | Locate the item that acts as the catalyst to move the objective story forward |
| Obj. Story Inhibitor | V | Locate the item that impedes the objective story's progress |
| Obj. Story Stipulation | T | Locate the standard by which progress is measured in the Objective Story |
| ADDITIONAL OBJECTIVE STORY APPRECIATIONS | | |
| Story Goal | T | Locate the common goal of the objective characters |
| Story Consequence | T | Locate the area that best describes the result of failing to achieve the goal |
| Story Costs | T | Locate the area that best describes the costs incurred while trying to achieve the goal |
| Story Dividends | T | Locate the area that best describes the dividends accrued while trying to achieve the goal |
| Story Requirements | T | Locate the area that best describes the requirements that must be met prior to achieving the goal |
| Story Prerequisites | T | Locate the area that best describes what is needed to meet the story requirements |
| Story Preconditions | T | Locate the area that best describes the conditions imposed on meeting the story's requirements |
| Story Forewarnings | T | Locate the area that best describes the imminent approach of the story consequences |
| SUBJECTIVE STORY APPRECIATIONS | | |
| Subj. Story Domain | C | Locate the domain in which the subjective story takes place |
| Subj. Story Concern | T | Locate the area of concern between the Main Character and the Obstacle Character |
| Subj. Story Range | V | Locate the subjective story's thematic focus |
| Subj. Story Problem | E | Locate the source of the problems between the Main Character and the Obstacle Character |
| Subj. Story Solution | E | Locate the solution to the problems between the Main Character and the Obstacle Character |
| Subj. Story Focus | E | Locate where attention is focused in the subjective story |
| Subj. Story Direction | E | Locate the direction of efforts in the subjective story |
| Subj. Story Catalyst | V | Locate the item that acts as the catalyst to move the subjective story forward |
| Subj. Story Inhibitor | V | Locate the item that impedes the subjective story's progress |
| Subj. Story Stipulation | T | Locate the standard by which growth is measured in the Subjective Story |

-continued

| MAIN CHARACTER APPRECIATIONS | | |
|---|---|---|
| MC Domain | C | Locate the domain in which the Main Character operates |
| MC Concern | T | Locate the area of the Main Character's concern |
| MC Range | V | Locate the Main Character's thematic focus |
| MC Problem | E | Locate the source of the Main Character's problems |
| MC Solution | E | Locate the solution to the Main Character's problems |
| MC Focus | E | Locate where the Main Character's attention is focused |
| MC Direction | E | Locate the direction of the Main Character's efforts |
| MC Unique Ability | V | Locate the item that makes the Main Character uniquely able to achieve the goal |
| MC Critical Flaw | V | Locate the item that undermines the Main Character's efforts |
| MC Stipulation | T | Locate the standard by which the Main Character judges the degree of their concern |
| OBSTACLE CHARACTER APPRECIATIONS | | |
| OC Domain | C | Locate the domain in which the Obstacle Character operates |
| OC Concern | T | Locate the area of the Obstacle Character's concern |
| OC Range | V | Locate the Obstacle Character's thematic focus |
| OC Problem | E | Locate the source of the Obstacle Character's problems |
| OC Solution | E | Locate the solution to the Obstacle Character's problems |
| OC Focus | E | Locate where the Obstacle Character's attention is focsed |
| OC Direction | E | Locate the direction of the Obstacle Character's efforts |
| OC Unique Ability | V | Locate the item that makes the Obstacle Character uniquely able to thwart the Main Character |
| OC Critical Flaw | V | Locate the item that undermines the Obstacle Character's efforts |
| OC Stipulation | T | Locate the standard against which the Obstacle Character's concern is measured |

Partner Relationships

Each addressed object, whether it be a unit, quad, quad of quads, chess-set, or superset, has a number of associated "partners". As described above, certain relationships result in pairs, such as dynamic pairs, companion pairs, and dependent pairs. For each object in a pair, the other object that completes the pair is referred to as the partner. These partner relationships can be used to define the appreciations that comprise a storyform.

In a broad sense, an object can have three types of partners, a dynamic partner, a companion partner, and a dependent partner. In the preferred embodiment of the invention, each partner can be an independent partner, inverse partner, or correspondent partner.

Unit Partners

Dynamic Partners

1. Independent Dynamic Partner

The independent dynamic partner of a unit is the unit that is diagonal to the unit in the same quad. This is illustrated by reference to FIG. 9, which illustrates the element level of the Universe class. Referring first to unit 11110, the variation identified as "knowledge", the dynamic partner of this unit is diagonal to that unit in the same quad, namely "thought" at address 11140. The dynamic partner of "chaos" at address 11130 is "order" at address 11120. (For thought and chaos, the independent dynamic partners are knowledge and order, respectively).

2. Inverse Dynamic Partner

Figure 9:
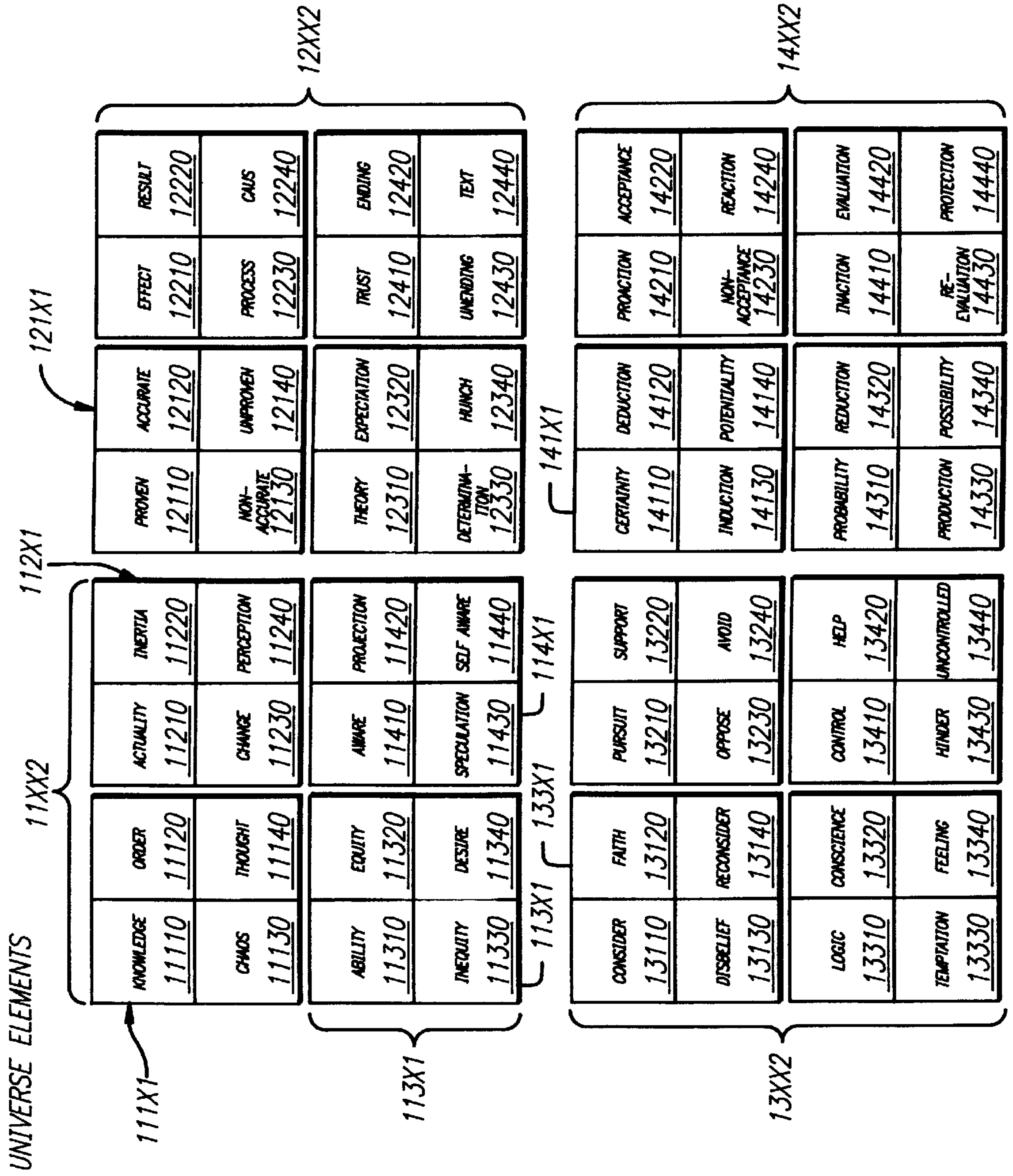
FIG. 9 illustrates the universe class element level of the quad structure of the present invention.

The inverse dynamic partner of a unit of interest is the unit that has the same position in a quad in the dynamic relationship to the quad that contains the unit of interest. Referring to FIG. 9, consider the unit knowledge at address 11110. The inverse dynamic partner of this unit is in the quad that is in a dynamic relationship to the quad containing knowledge. The quad containing the unit knowledge is the quad at address 111X1. The quad that is in dynamic relationship to this quad is the quad at address 114X1 (containing aware 11410, projection 11420, speculation 11430, and self aware 11440). The unit in the same position as knowledge 11110 is aware at address 11410.

Using this definition, the inverse dynamic partner of feeling at address 13340 is avoid at address 13240.

3. Correspondent Dynamic Partner

The correspondent dynamic partner of a unit of interest is the unit in the same position in the "set" that is in the dynamic relationship to the unit of interest. For example, consider the unit knowledge 11110. It is contained in the set identified by the address 11XX2. The set that has a dynamic relationship to that set is the set identified by address 14XX2. The unit in the same position in that set is "certainty" at address 14110 and thus is the correspondent dynamic partner of knowledge 11110.

Companion Partners

1. Independent Companion Partner

The independent companion partner of a unit is the unit that is horizontal to the unit in the same quad. Referring to unit 11110 of FIG. 9, the variation identified as "knowledge", the companion partner of this unit is horizontal to that unit in the same quad, namely "order" at address 11120. The companion partner of "chaos" at address 11130 is "thought" at address 11140.

2. Inverse Companion Partner

The inverse companion partner of a unit of interest is the unit that has the same position in a quad in the companion (horizontal) relationship to the quad that contains the unit of interest. Referring to FIG. 9, consider the unit knowledge at address 11110. The inverse companion partner of this unit is in the quad that is in a companion relationship to the quad containing knowledge. The quad containing the unit knowledge is the quad at address 111X1. The quad that is in companion relationship to this quad is the quad at address 112X1 (containing actuality 11210, inertia 11220, change 11230, and perception 11240). The unit in the same position as knowledge 11110 is "actuality" at address 11210.

Using this definition, the inverse companion partner of feeling at address 13340 is uncontrolled at address 13440.

3. Correspondent Companion Partner

The correspondent companion partner of a unit of interest is the unit in the same position in the "set" that is in the companion relationship to the unit of interest. For example, consider the unit knowledge 11110. It is contained in the set identified by the address 11XX2. The set that has a companion relationship to that set is the set identified by address 12XX2. The unit in the same position in that set is "proven" at address 12110 and thus is the correspondent companion partner of knowledge 11110.

Dependent Partner

1. Independent Dependent Partner

The independent dependent partner of a unit is the unit that is vertical to the unit in the same quad. Referring to unit 11110 of FIG. 9, the variation identified as "knowledge", the dependent partner of this unit is vertical to that unit in the same quad, namely "chaos" at address 11130. The dependent partner of "order" at address 11120 is "thought" at address 11140.

2. Inverse Dependent Partner

The inverse dependent partner of a unit of interest is the unit that has the same position in a quad in the dependent (vertical) relationship to the quad that contains the unit of interest. Referring to FIG. 9, consider the unit knowledge at address 11110. The inverse dependent partner of this unit is in the quad that is in a dependent relationship to the quad containing knowledge. The quad containing the unit knowledge is the quad at address 111X1. The quad that is in dependent relationship to this quad is the quad at address 113X1 (containing ability 11310, equity 11320, inequity 11330, and desire 11340). The unit in the same position as knowledge 11110 is "ability" at address 11310.

Using this definition, the inverse dependent partner of feeling at address 13340 is reconsider at address 13140.

3. Correspondent Dependent Partner

The correspondent dependent partner of a unit of interest is the unit in the same position in the "set" that is in the dependent relationship to the unit of interest. For example, consider the unit knowledge 11110. It is contained in the set identified by the address 11XX2. The set that has a dependent relationship to that set is the set identified by address 13XX2. The unit in the same position in that set is "consider" at address 13110 and thus is the correspondent dependent partner of knowledge 11110.

Complementary Partners

In the preferred embodiment, the present invention provides for a method of finding a partner of a unit at the element level in another class. This partner is referred to as the "complementary partner" of the unit at the element level. The complementary partner of a unit of interest occupies the same position as the unit of interest but in a class in the desired relationship (dynamic, companion, dependent) to the class containing the unit of interest.

Quad Partners

As noted previously, an address can refer to an object larger than a unit. Consider the quad identified by address 111X1, the quad in the upper left hand corner that includes units knowledge 11110, order 11120, chaos 11130, and thought 11140. The independent dynamic partner for this quad is diagonal in the same quad. In this case the quad is comprised of quads, so that the independent dynamic partner of quad 11X01 is the quad identified by address 114X1, consisting of aware 11410, projection 11420, speculation 11430, and self aware 11440.

The independent companion partner of quad 111X1 is quad 112X1. The independent dependent partner is quad 113X1.

The inverse dynamic partner of quad 111X1 is quad 141X1. The inverse companion partner is quad 121X1 and the inverse dependent partner is quad 133X1.

Figure 10:
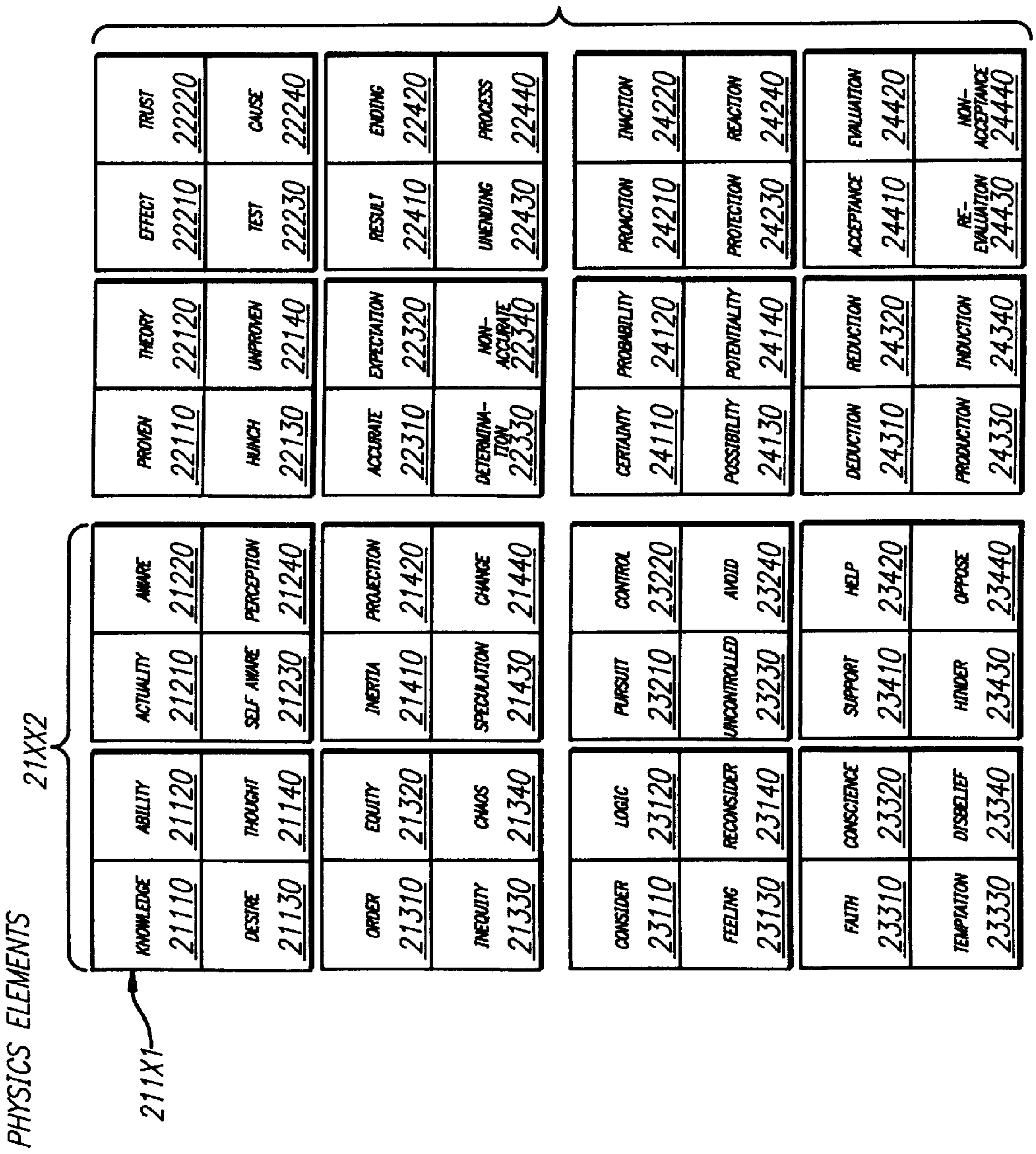
FIG. 10 illustrates the physics class element level of the quad structure of the present invention.

The correspondent dynamic partner of quad 111X1 is the corresponding quad in the set that is in the dynamic relationship to that quad of interest. Thus, the correspondent dynamic partner of quad 111X1 is quad 411X1 from the element level of the "mind" class (FIG. 12). The correspondent companion partner is quad 211X1 from the element level of the "physics class (FIG. 10). The correspondent dependent partner of quad 111X1 is quad 311X1 from the element level of the "psychology class" (FIG. 11).

Set Partners

A set consists of sixteen units, i.e. a quad of quads. Consider the set at address 11XX2 of FIG. 9. The independent dynamic partner is set 14XX2. The independent companion partner is set 12XX2, and the independent dependent partner is set 13XX2.

The inverse and correspondent partners are the same for a set. Here, the inverse and correspondent dynamic partner of set 11XX2 is set 41XX2 of FIG. 12. The inverse and correspondent companion partner is set 21XX2 of FIG. 10, and the inverse and correspondent dependent partner is set 31XX2 of FIG. 11.

Chess Set Partners

The independent, inverse and correspondent partners for the chess set 1XXX3 (universe class elements, FIG. 9) are the same. The dynamic partner is the chess set 4XXX3 of FIG. 12, the companion partner is the chess set 2XXX3 of FIG. 10, and the dependent partner is the chess set 3XXX3 of FIG. 11.

Semantic Partner

There is an additional relationship in the preferred embodiment that is unique to the element level. As noted, in each class the units are the same, but are rearranged in each class. The semantic partner of a unit at the element level is the unit that has the same semantic value and is in a class in the appropriate relationship. For example, the dynamic semantic partner of order 11120 of the universe class is order 41310 in the mind class. The companion semantic partner of order 11120 is order 21310 of the physics class. The dependent semantic partner of order 11120 is order 31220 in the psychology class.

The following is a table that describes the general partner relationships.

TABLE 1

| PARTNER RELATIONSHIPS: | |
|---|---|
| Dynamic Pair/Partner | Diagonal in same quad. |
| Companion Pair/Partner | Horizontal in same quad. |
| Dependent Pair/Partner | Vertical in same quad. |
| Inverse [Dynamic/ Companion/Dependent] Partner | In a set, given a relationship and an address: the Inverse Partner will be in the Item in the same position in the quad that has that relationship. |
| Correspondent [Dynamic /Companion/ Dependent] Partner | In a ChessSet, given a relationship and an address: the Correspondent Partner will be the unit in the same position in the set that has that relationship. [variations & elements only] |
| Semantic [Dynamic/ Companion/Dependent] Partner | At the element level, the address of the unit that has the same semantic value at in the class with that relationship. |
| Complement [Dynamic/ Companion/Dependent] Partner | At the element level, the address of the unit that has the same correspondent address in the class with that relationship. |

Calculating Partner Address

The present invention takes advantage of the addressing scheme to provide a method for calculating partner addresses for any give address. In the preferred embodiment, the following table is used:

TABLE 2

| | 1 | 2 | 3 | 4 |
|---|---|---|---|---|
| Dynamic | 4 | 3 | 2 | 1 |
| Companion | 2 | 1 | 4 | 3 |
| Dependent | 3 | 4 | 1 | 2 |

The table is used in conjunction with an algorithm for determining a partner object. The argument for the algorithm is an address, a dynamic resolution, and a relationship. The return is an address of the desired partner. The address is as described above. The dynamic resolution is one of independent, inverse, and correspondent. The relationship is dynamic, companion, and dependent.

The desired address, due to the addressing scheme of the present invention, will be the same as the source address except for one digit. The digit to be changed is identified by:

Addr2Change=level−dynamic res−ItemSize

Level is the level of the four level class structure of the preferred embodiment at which the address of interest resides. This can be determined by subtracting the number of zero digits in the first four positions from four. For example, in address 11102, the number of zero digits in the first four positions is 1. Subtracting this from 4 leaves 3. We would expect this address to be at the third (variation) level. Referring to FIG. 8, it is seen that address 11102 is the set of variations of the universe level and resides at level 3.

Alternatively, the level is determined by the number of non-zero digits in the first four positions. For example, given address 30001, the number of non-zero leading digits is one (the first digit is non-zero, followed by a zero in the second, third, and fourth positions). Thus, address 30001 is at the first level. Referring to FIG. 6, it can be seen that address 30001 is the quad at the class level. The class level is level 1. For address 12000, the number of non-zero leading digits is two. Referring to FIG. 7, address 12000 is unit "progress" at the type level, level 2.

The dynamic resolution is determined by which resolution of partner is to be found and is provided with the source address. In the preferred embodiment, the resolutions have the values independent (1), inverse (2), and correspondent (3).

The size is determined by the value in the last position of the source address and has a value of 0–3 in the preferred embodiment.

EXAMPLE 1

Unit

Find the inverse dynamic partner of address 11110. The level is 4 (element level, knowledge unit), the dynamic resolution is 2 (inverse), and the item size is 0. Thus, the digit to be changed is 4−2−0=2. The third digit is to be changed (note that the first digit is in the zero place, the second is in the first place, etc). To determine what the digit is to be changed to, refer to Table 2. Find the column that corresponds to the value of the source address digit at the location to be changed. In this case, the third digit has a value of 1. Look at the column of value 1 and go to the row that has the same dynamic relationship of interest, namely the row marked "dynamic". The value there is a "4". So the third digit in the source address is changed to a 4, leaving the new address as 11410. Referring to the example given above with respect to inverse dynamic partners of units, we already know that the inverse dynamic partner of knowledge at 11110 is "aware" at address 11410 (see FIG. 9).

Note that when implemented in C-code, tables are zero indexed, so that it may be necessary to subtract 1 from the value of the digit to be changed to find the correct index into the table.

EXAMPLE 2

Quad

Find the correspondent companion partner for the quad at address 12211. The level is 4 (4 minus no zero digits in the first four places). Referring to FIG. 9, the quad is the quad that contains effect 12210, result 12220, process 12230 and cause 12240. We expect the correspondent companion partner to be at 22211. The dynamic resolution is 3 and the item size is 1. The digit to be changed is thus 4−3−1=0. The zero-th digit is the first digit in the address (1 in the example). Referring to Table 2, the column for 1 is located and the value at the companion row is seen to be 2. Thus, the first digit is changed from a 1 to a 2, giving a partner address for this quad of 22211.

An example of a C-code implementation of the above algorithm is described below in the microfiche that includes files "RELATION.H" and "RELATION .CC".

Rules for Identifying and Predicting Appreciations

The present invention provides algorithmic rules for indentifying and predicting appreciations. As the rules are applied, certain relationships become constrained, leading to the predictive capabilities of the invention.

A list of abreviations of appreciations is described below in Table 3:

-continued

| | | | |
|---|---|---|---|
| Given: In a neutral model (Z pattern) | SST2 | ←→ | ✌ SST3 |
| Definition | SSVQ Class # | ←→ | SSC # (several implied by) |
| Given: In a neutral model (Z pattern) | SSVQ1 | ←→ | ✌ SSVQ4 |
| Given: In a neutral model (Z pattern) | SSVQ2 | ←→ | ✌ SSVQ3 |
| MCC is MC Class. When | MCC ☞ SSC | ←→ | ☮✖ MCC = ☮➘ |

TABLE 3

| | | | |
|---|---|---|---|
| C1 | Class for Act 1 | SCB | Steadfast Character Blind Side |
| C2 | Class for Act 2 | SCF | Steadfast Character Focus |
| C3 | Class for Act 3 | SE | Solution Element |
| C4 | Class for Act 4 | OSC | Objective Story Class |
| CF | Critical Flaw | OST | Objective Story Type (was OSGT) |
| SSC | Subjective Story Class | OSV | Objective Story Variation |
| SST1 | Subjective Story Type for Act 1 | OSVQ | Objective Story Variation Quad |
| SST2 | Subjective Story Type for Act 2 | OCC | Obstacle Character Class |
| SST3 | Subjective Story Type for Act 3 | UA | Unique Ability |
| SST4 | Subjective Story Type for Act 4 | CDP | CoDynamic Pair |
| SSVQ1 | Subjective Story Variation for Act 1 | CP | Companion Pair |
| SSVQ2 | Subjective Story Variation for Act 2 | DP | Dynamic Pair |
| SSVQ3 | Subjective Story Variation for Act 3 | DEP | Dependent Pair |
| SSVQ4 | Subjective Story Variation for Act 4 | EXAM | Character Evaluation Set |
| MCC | Main Character Class | MC | Main Character |
| DE | Direction Element | MET | Character Methodology Set |
| FE | Focus Element | MOT | Character Motivation Set |
| OBJ | Objective Characters | NEG | Negative Story |
| ORT | Objective Requirement Type | OC | Obstacle Character |
| OSF | Objective Story Focus | CC | Change Character |
| CCB | Change Character Blind Side | POS | Positive Story |
| CCF | Change Character Focus | PUR | Character Purpose Set |
| PEQ | Problem Element Quad | SC | Steadfast Character |
| PE | Problem Element | | |

The following is a list of symbols representing functions that can be applied to units selected in the invention:

| | |
|---|---|
| + | Positively Charged Pair |
| − | Negatively Charged Pair |
| ↕ | Inverse |
| # | Address Value |
| ➘ | Dynamic Pair Orientation (or Charge) |
| ✖ | Co-Dynamic Pair |
| ✌ | Dynamic Partner |
| ☞ | Companion Partner |
| → | Correspondent |
| ☮ | Orientation (or Charge) of a pair within a quad |
| ★ | Relative Position (TKAD atomic value) within a quad |
| ▼ | Element Link (Class Dependent) |

The following expressions define the apreciations resulting from particular relationships.

| | | | |
|---|---|---|---|
| Given: In a neutral model (Z pattern) | C1 | ←→ | ✌ C4 |
| Given: In a neutral model (Z Pattern) | C2 | ←→ | ✌ C3 |
| Given: In a neutral model (Z Pattern) | SST1 | ←→ | ✌ SST4 |

-continued

| | | | |
|---|---|---|---|
| | | | CC UA |
| MCC is companionto SSC, it must be dependent to OSC (Objective Problem Class. Relationship of MCC to OSC is determined by the Combination of Do-er/Be-er and Start/Stop | | | |
| This is the other possibility that can exist beween the MC Class and the OSC. | MCC ☞OSC | ←→ | SSVQ3 ☞ SSVQ4 |
| Another state that exists when the MC Class is companion to the OSC. | MCC ☞ OSC | ←→ | ➘ MCC = ➘ CC UA |
| If Male Mental Sex: Definition | FE | ←→ | ✌ DE |
| If Male Mental Sex | FE ☞ PE | ←→ | MC Class ☞ OSC |
| If Male Mental Sex: Positve means "Stop" in the bias questions. | FE ☞ PE | ←→ | POS |
| If Male Mental Sex: If Stop has been determined, then as above, FE must be | FE ☞ PE | ←→ | ➘ PE = ➘ OSC |

-continued

| | | | |
|---|---|---|---|
| companion to PE, which requires this other relationship to also exist. | | | |
| Definition | MC Class | ←→ | ✌ OC Class |
| Negative means "Start" in the bias questions. If Start, then the MC Class will be the fourth act class. | NEG | ←→ | C4 = MC Class |
| Start/Stop and Do-er Be-er determine position of MC to OSC and therefore SSC. This is just a restating of the Start part of that relationship, | NEG | ←→ | MC Class ☞ SSC |
| Called by bias answer of "Start". | NEG | ←→ | ☮✖ MC UA = ☮➘ MC Class |
| Called by bias answer of "Start" | NEG | ←→ | ☮➘ PE = ☮✖ OSVQ |
| Given (that the objective characters are created in the elements of the OSC). | OBJ | ←→ | OSC (Elements) |
| Given (relationship of the labelling or "meaning" of the Objective element sets to the Problem Class, MC Class and their partners). | ★ OBJ EXAM | ←→ | ★ OCC |
| Same as above. | ★ OBJ MET | ←→ | ★ SSC |
| Same as above. | ★ OBJ MOT | ←→ | ★ MCC |
| Same as above. | ★ OBJ PUR | ←→ | ★ OSC |
| Definition of the relationship of the Focus Dynamic pair to the PE dynamic pair. | OSF DP | ←→ | ✖ PE DP |
| Given | CC Class | ←→ | ✌ SC Class |
| Called by "Change" | CC = MC | ←→ | ☮ PE CP = ↕☮ OSVQ CP |
| Same as above | CC = MC | ←→ | SST2 ☞ SST4 |
| Same as above | CC = MC | ←→ | MC CF ✌ MC UA |
| Same as above | CC = MC | ←→ | CC CF ✌ OC UA |
| Same as above | CC = MC | ←→ | CC ORT = → SC ORT |
| Definition of the relationship of the CC blind side DP to the CC focus DP. | CCB DP | ←→ | ✖ CCF DP |
| Definition of Identity | PE Class # | ←→ | OSC # |
| Definition of identity | PE Class # | ←→ | ✌ SCC # |
| Called by "Stop" | POS | ←→ | C1 = MC Class |
| Called by "Stop" | POS | ←→ | MC Class ☞ OSC |
| Called by "Stop" | POS | ←→ | ➘ MC UA = ➘ MC Class |
| Called by "Stop" | POS | ←→ | ➘ PE = ➘ OSVQ |
| Called by "Steadfast" | SC = MC | ←→ | ☮ PE CP = ☮ OSVQ CP |
| Called by "Steadfast" | SC = MC | ←→ | C2 ☞ C1 |
| Called by "Steadfast" | SC = MC | ←→ | OST3 ☞ OST4 |
| Called by "Steadfast" | SC = MC | ←→ | MC CF ☞ MC UA |
| Called by "Steadfast" | SC = MC | ←→ | OC CF ☞ CC UA |
| Called by "Steadfast" | SC = MC | ←→ | CC ORT = SC ORT |
| Given | SC ORT | ←→ | ✌ OST |
| Definition of relationship of SC focus DP to SC blind side DP. | SCF DP | ←→ | ✖ SCB DP |
| Given | SE | ←→ | ✌ PE |
| Semantic link between Problem class focus | OSC ▼ OSF | ←→ | OCC ▼ SCF |

-continued

| | | | |
|---|---|---|---|
| element and SC focus element. | | | |
| Semantic link between Problem Class problem element and CC problem element. | OSC ▼ PE | ←→ | MCC ▼ CCB |
| Defined positional relationship. | OST | ←→ | → SST4 |
| Definition of identity. | OST Class # | ←→ | OSC # |
| Definition of identity. | OST Class # | ←→ | ✌ SST Class # |
| Defined positional relationship. | OSVQ | ←→ | → SSVQ4 |
| Definition of identity | OSVQ Class # | ←→ | OSC # |
| Definition of identity | OSVQ Class # | ←→ | ✌ SSVQ Class # |
| | OCC ☞ SSC | ←→ | ☮✖ OCC = ☮➘ SC UA |
| | OCC ☞ SSC | ←→ | SSVQ2 ☞ SSVQ4 |
| | OCC ☞ OSC | ←→ | ➘ OCC = ➘ SC UA |
| | ☮ CC Class CP | ←→ | ↕☮ CC UA CP |
| | ☮ SC Class CP | ←→ | ☮ SC UA CP |

The above rules determine which partner relationship is to be returned when a unit address is selected. By building appreciations based on the above, a storyform can be generated.

Constraints that arise as appreciations are established and dynamic relationships are selected determine other relationships. Choosing Do-er or Be-er determines which companion pair of classes in which the main character will be found. As a do-er, the main character will be in either Universe or Physics. As a be-er, the main character will be in either Mind or Psychology.

Choosing Stop or Start determines the relationship of the main character's class to that of the objective story class. In a stop story, the two classes will have a companion relationship. In a start story, the two classes will have a dependent relationship For example, consider a "do-er" and "stop" story. Do-er specifies that the main character class must be either Universe or Physics. Stop specifies that the objective story class must have a companion relationship to the main character class meaning that it must also be Universe or Physics. So, if Universe is selected as the objective story class then Physics would be the main character class, whereas if Physics is selected as the objective story class, Universe would be the main character class.

Now change the example to a "do-er" and "start" story. Start specifies that the objective story class must have a dependent relationship to the main character class meaning that it must be either Psychology or Mind. If Psychology is selected to be the objective story class, then the main character class would be Universe. If Mind is selected to be the objective story class, then the main character class would be Physics.

Essential Questions

One direct path for creating or selecting a storyform is by answer twelve essential questions. These questions are referred to as "essential" in the sense that answering them leads to identification of one of the available storyforms.

However, there are other paths to the storyform. Taking these other paths eventually results in generating the relationships that result from answering the tweleve essential questions.

The questions relate to character dynamics, plot dynamics, and thematic elements. The character dynamics relate to questions of the main character resolve (change or steadfast), direction (stop or start), approach (do-er or be-er), and mental sex (male or female). The plot dynamics relate to questions of plot work (action or decision), plot limit (timelock or optionlock), plot outcome (success or failure), and plot judgement (good or bad). The thematic elements relate to questions of thematic class (in which class does the story take place), thematic concern (what is concern of story, choose at type level in appropriate class), thematic range (what is central thematic focus, choose at variation level), and thematic problem (what is source of problems, choose at element level).

By making choices for the above questions, appreciations are generated, relationships are established and constraints are created so that all other relationships can be determined and a storyform selected. In the present invention, the user is guided through the questions through a menu driven system. As each selection is made, menu choices are constrained based on prior selections. For example, when the universe class is chosen as the thematic class, the available thematic concerns are limited to the four units at the type level of the universe class.

Storyform Selection

There are 32,768 storyforms in the preferred embodiment of the invention, and these story forms are stored in a storyform table. Each storyform in the table is described in the preferred embodiment by 40 appreciations. In other embodiments, a greater or fewer number of appreciations may be used without departing from the scope of the present invention. As a user provides or selects appreciations, the storyform table is checked to see which storyforms satisfy the appreciations selected. The choices that a user can make may be constrained by prior selections. Subsequent constrained choices of appreciations further narrows the number of suitable (valid) storyforms. Ideally, the process continues until a single storyform is selected.

Figure 14A:
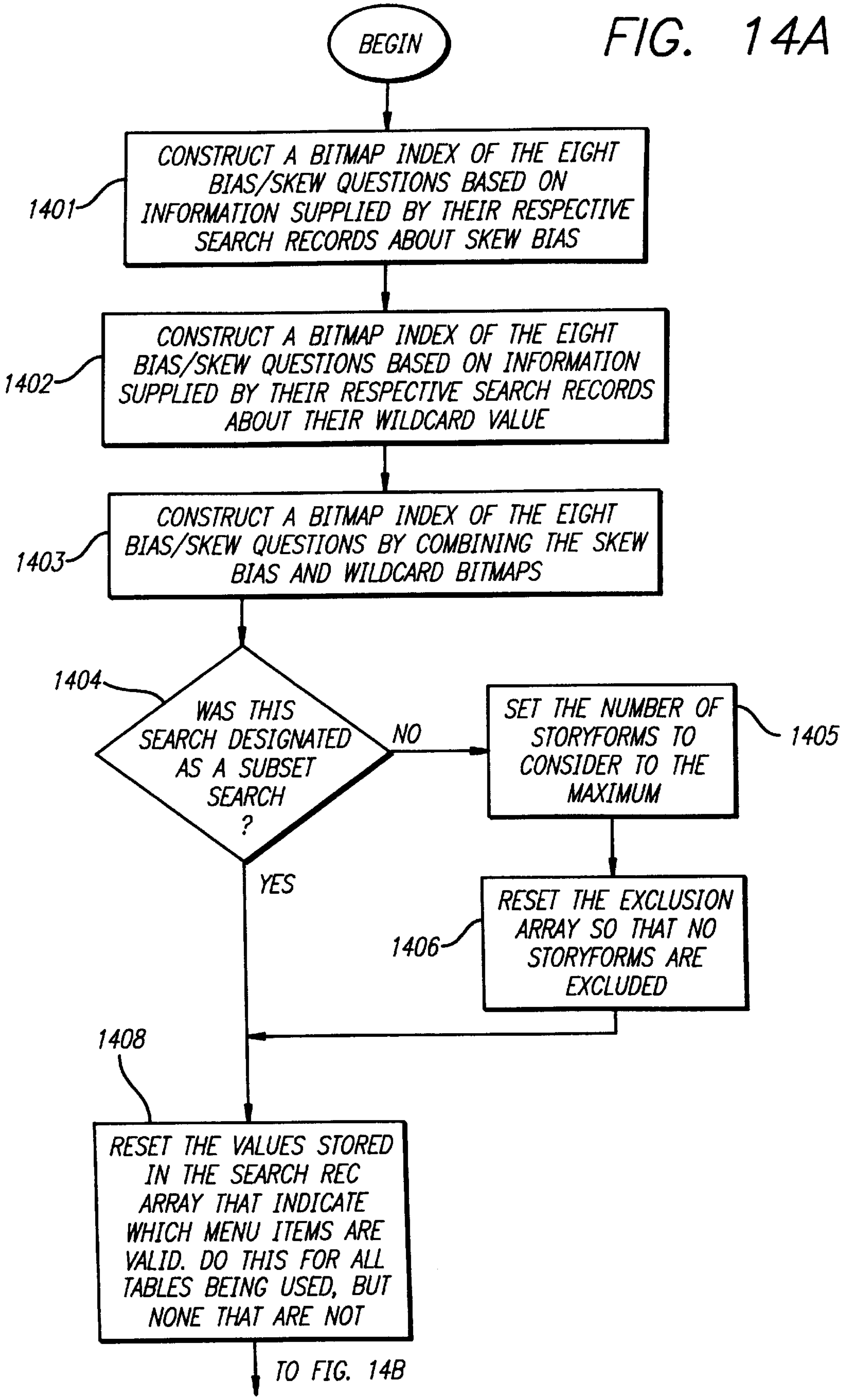

A method for searching the storyform table and selecting valid storyforms is illustrated in FIGS. 14A–14F. Referring first to FIG. 14A, at step 1401 a bitmap index of eight bias/skew questions is constructed. This bitmap is based on information supplied by their respective search records about skew bias. At step 1402 construct a bitmap index of the eight bias/skew questions based on information by their respective search records about their wildcard value. At step 1403, construct a bitmap index by combining the skew/bias bitmnap of step 1401 and the wildcard bitmap of step 1402.

At decision block 1404, answer the argument "was this search designated as a subset search?". If the argument is true, proceed to step 1408. If the argument at decision block 1404 is false, set the number of stories to consider to the maximum at step 1405. At step 1406 reset the exclusion array so that no stories are excluded and proceed to step 1408. At step 1408 reset values stored in the search record array that indicate which menu items are valid. This is done for all tables that are used, but for none that are not used. This step constrains selections available to a user, with the constraints based on selections previously made.

Figure 14B:
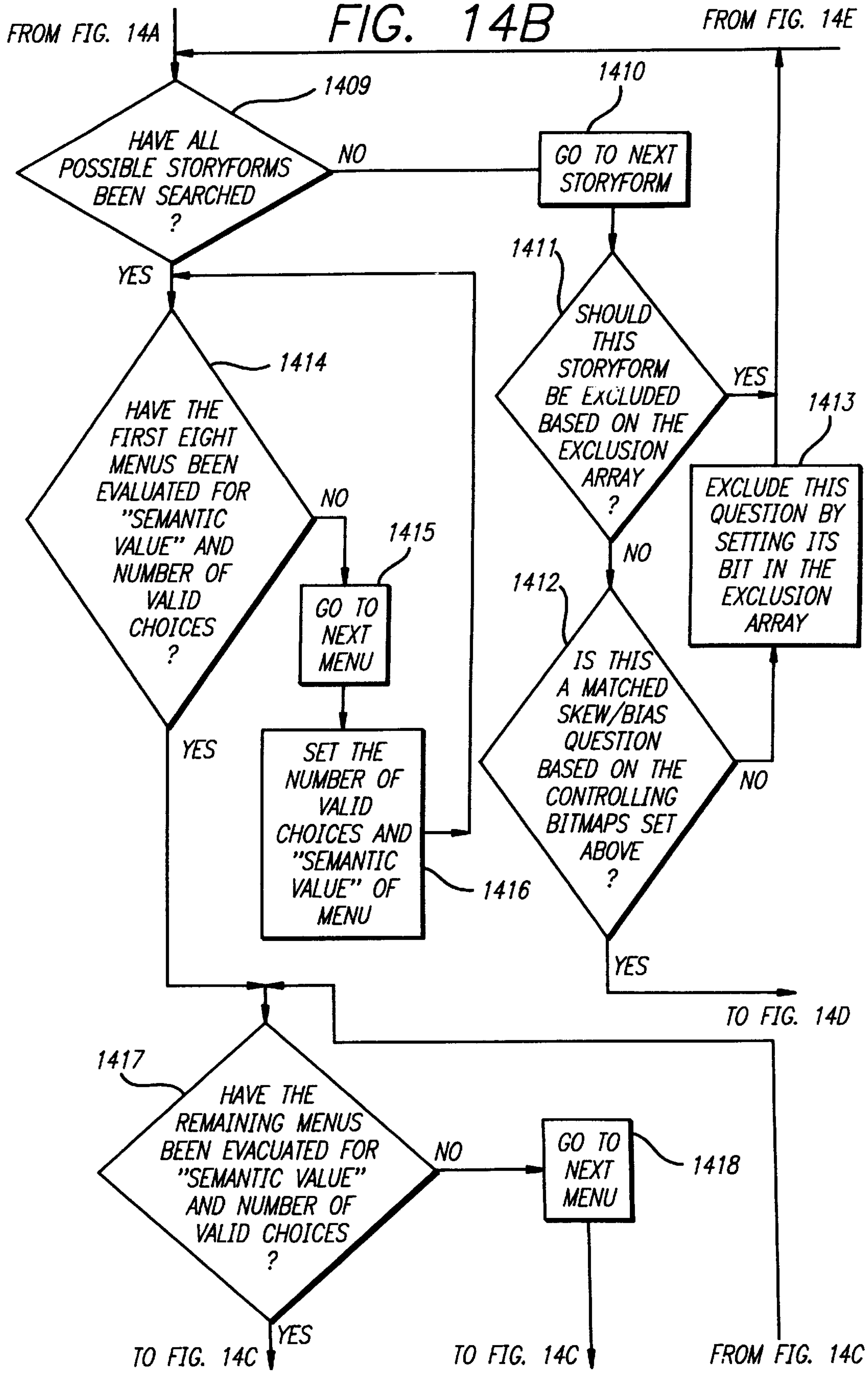

At decision block 1409 of FIG. 14B the argument "have all possible storyforms been searched" is made. If the argument is false, proceed to step 1410 and go to the next storyform. At decision block 1411 the argument "should this story be excluded based on the exclusion array?" is made. If the argument is true, return to decision block 1409. If the argument at decision block 1411 is false, proceed to decision block 1412. If the argument "is this a matched skew/bias question based on the controlling bitmaps set above?" is false, proceed to step 1413. At step 1413 exclude this question by setting its bit in the exclusion array, then return to decision block 1409.

Figure 14C:
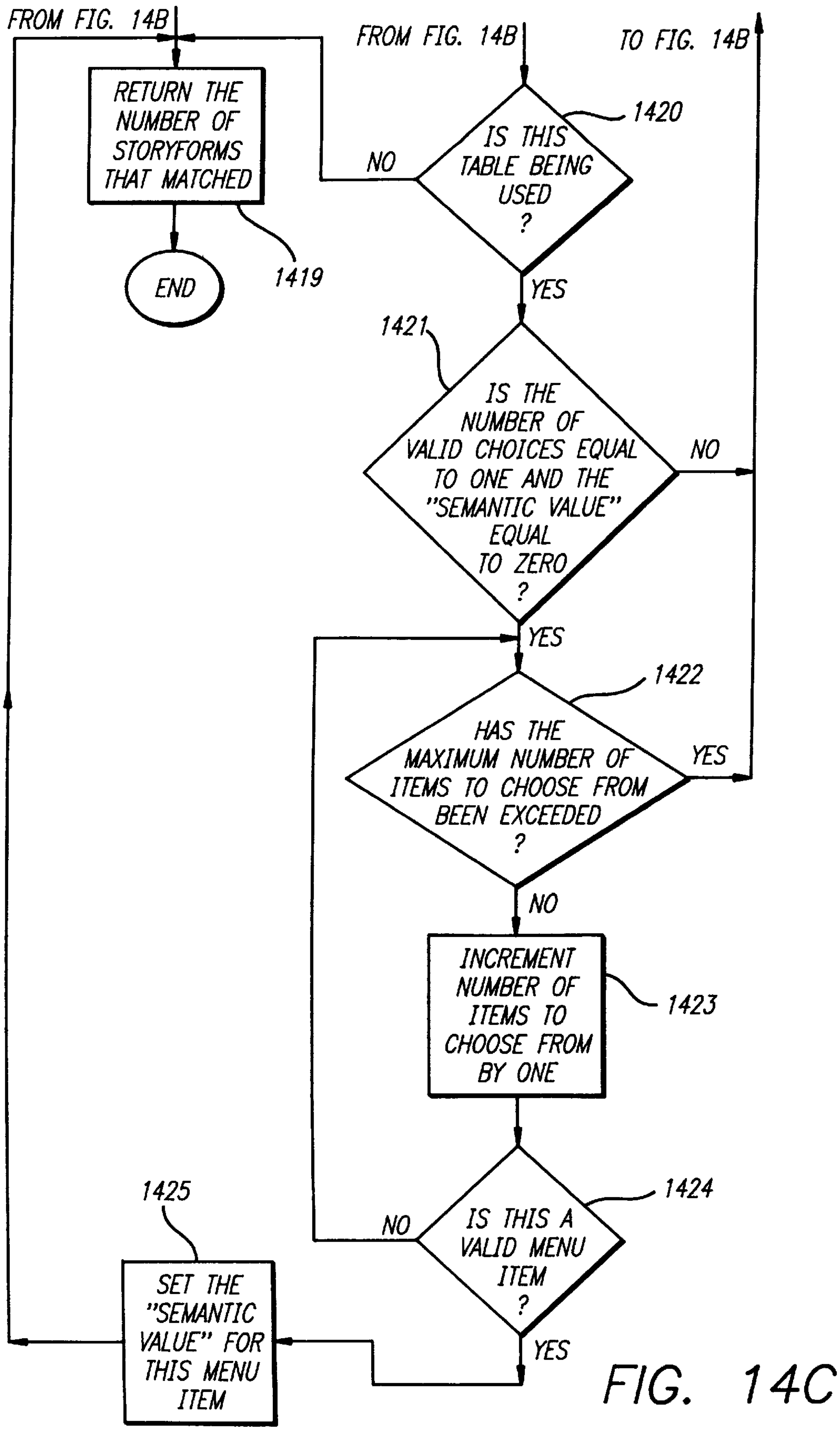
Figure 14D:
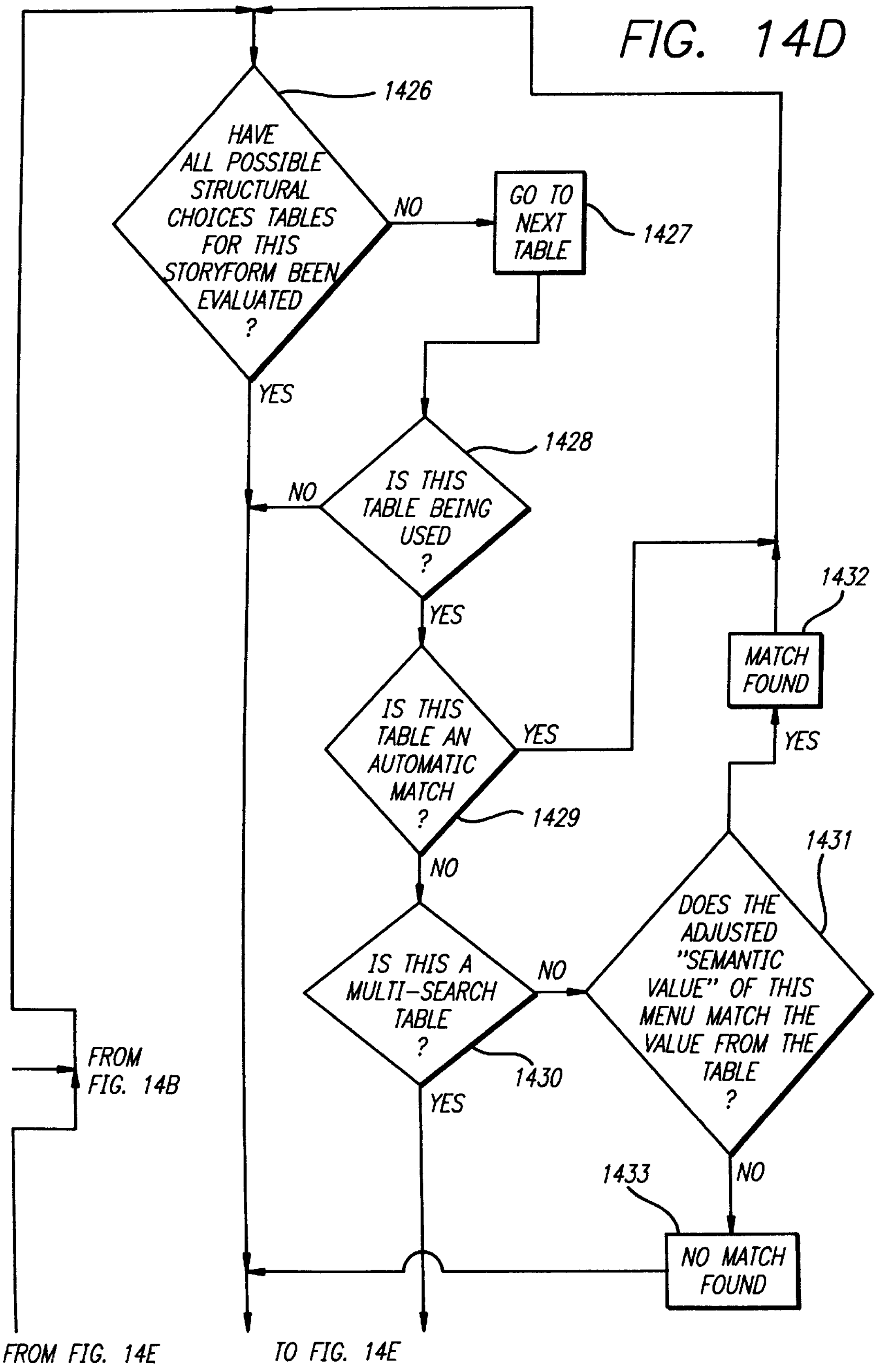

If the argument at decision block 1412 of FIG. 14B is true, proceed to decision block 1426 in FIG. 14D. If the argument "have all possible structural choices tables for this story been evaluated?" at decision block 1426 is false, go to next table at step 1427. At decision block 1428 if the argument "is this table being used?" is true, proceed to decision block 1429. If the argument "is this table an automatic match?" is true, return to decision block 1426. If the argument at decision block 1429 is false, proceed to decision block 1430.

At decision block 1430 if the argument "is this a multi-search table?" is false, proceed to decision block 1431 and the argument "does the adjusted semantic value of this menu match the value from the table?". If this argument is true, there is a match found at step 1432 and return to decision block 1426. If false, no match found at step 1433.

Figure 14E:
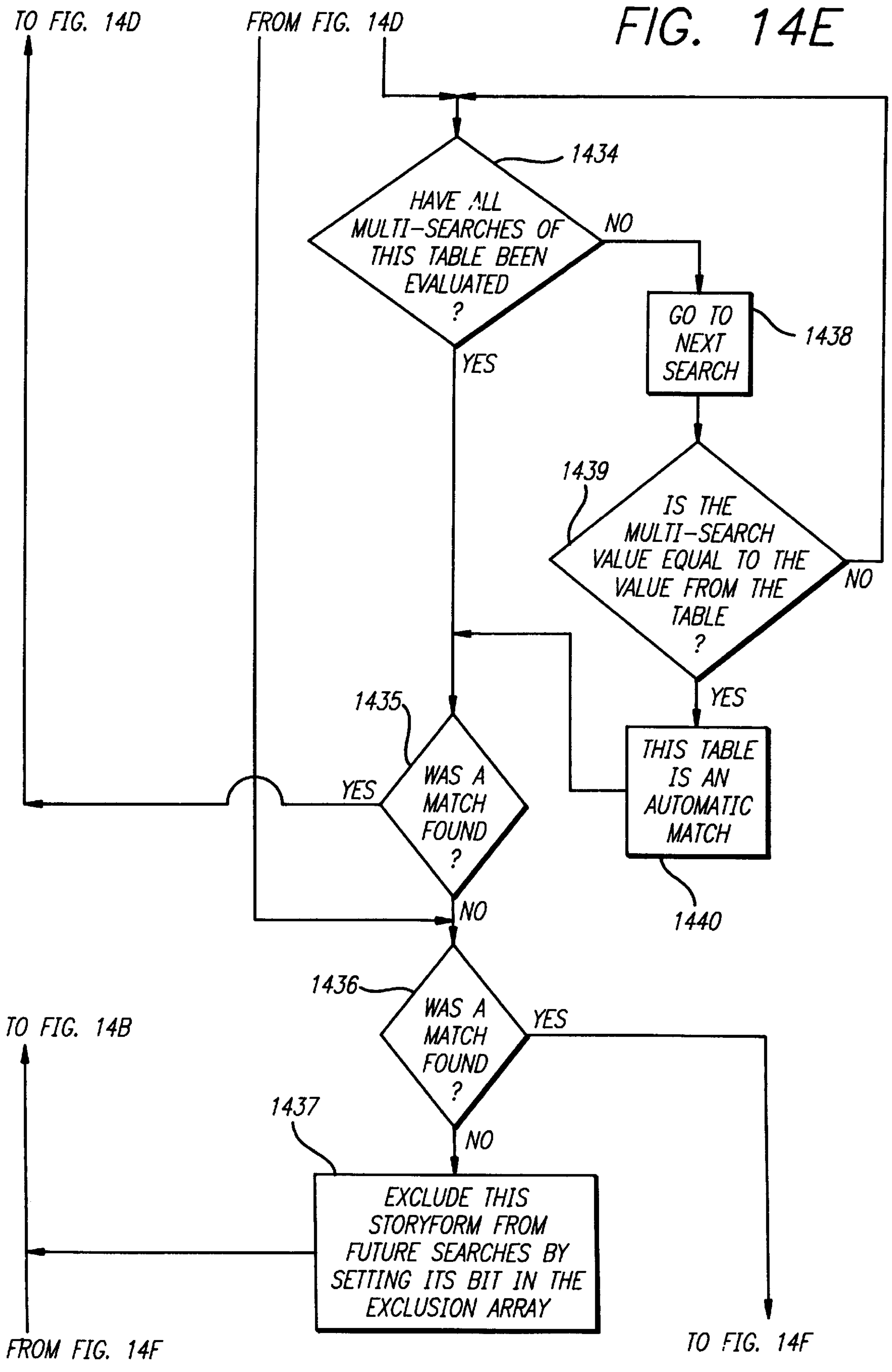

If the argument at decision block 1426 is true, or the argument at decision block 1428 is false, or there is not match found at step 1433, proceed to decision block 1436 of FIG. 14E. At this decision block, the argument "was a match found?" is made. If the argument is false, exclude this storyform from future searches by setting its bit in the exclusion array at step 1437 and return to decision block 1409.

If the argument at decision block 1430 is true, proceed to decision block 1434 and the argument "have all multi-searches of this table been evaluated?". If the argument is true, proceed to decision block 1435 and the argument "was a match found?". If the argument at decision block 1435 is false, proceed to decision block 1436. If the argument at decision block 1435 is true, return to decision block 1426.

If the argument at decision block 1434 is false, go to next search at step 1438. If the argument "is the multi-search value equal to the value from the table?" at decision block 1439 is false, return to 1434. If true, this table is an automatic match at step 1440 and proceed to decision block 1435.

If the argument at decision block 1436 is true, proceed to step 1441 of FIG. 14F and define the storyform as a match. At decision block 1442 the argument "have the first eight questions been evaluated for valid menu items? is made. If the argument is false, go to next question at step 1443, indicate if this menu item is valid for this storyform at step 1444 and return to decision block 1442. If the argument at decision block 1442 is true, proceed to decision block 1445.

At decision block 1445 the argument "have the remaining questions been evaluated for valid menu items?" is made. If the argument is true, increase the total number of storyforms that match by one at step 1446 and return to decision block 1409. If false, go to next question at step 1447. At decision block 1448 if the argument "is this table being used? is false, proceed to step 1446. If the argument is true, go to decision block 1449. At decision block 1449, if the argument "is the menu filled in yet?" is true, return to decision block 1445. If false, indicate that this menu item is valid for this storyform at step 1450 and proceed to decision block 1451. At decision block 1451 the argument "will this addition fill the menu?" is made. If true, the menu is full at step 1452 and return to decision block 1445. If false, return to decision block 1445.

If the argument at decision block 1409 of FIG. 14B is true, proceed to decision block 1414 and the argument "have the first eight menus been evaluated for semantic value and number of valid choices?". If the argument is false, go to next menu at step 1415, set the number of valid choices and semantic values of the menu at step 1416 and return to decision block 1414. If the argument at decision block 1414 is true, proceed to decision block 1417.

At decision block 1417, the argument "have the remaining menus been evaluated for semantic value and number of valid choices?" is made. If the argument is true, proceed to step 1419 in FIG. 14C. If the argument is false, proceed to the next menu at step 1418 and then to decision block 1420 in FIG. 14C.

Referring to FIG. 14C, at step 1419 return the number of storyforms that match and end. At decision block 1420 if the argument "is this table being used?" is false, proceed to step 1419. If true, proceed to decision block 1421 and test argument "is the number of valid choices equal to one and the semantic value equal to zero?". If the argument is false, return to decision block 1417. If the argument is true, proceed to decision block 1422.

At decision block 1422, if the argument "has the maximum number of items to choose from been exceeded?" is true, return to decision block 1417. If false, increment the number of items to choose from by one at step 1423. At decision block 1424, if the argument "is this a valid menu item?" is false, return to decision block 1422. If true, proceed to step 1425 and set the semantic value for this menu item. Then proceed to step 1419.

An example of code that can be used to implement the functionality described in FIGS. 14A–14F is shown below in Appendix A in files entitled storytble.h and storytble.cc.

The microfiche inlcudes examples of code for implementing the invention.

Computer System

Figure 15:
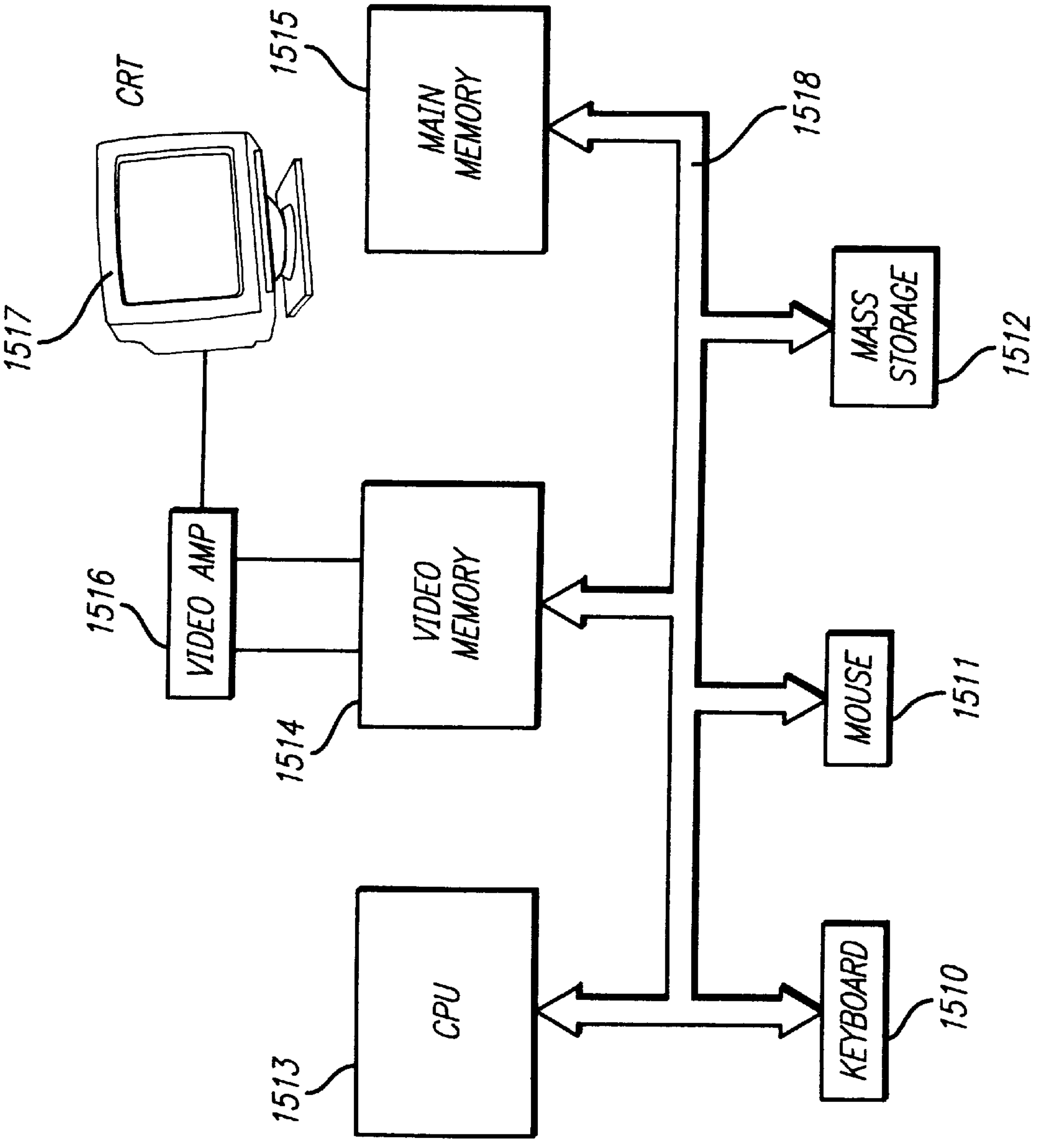
FIG. 15 illustrates an example of a computer system for implementing the present invention.

The present invention can be implemented on a general purpose computer such as illustrated in FIG. 15. A keyboard 1510 and mouse 1511 are coupled to a bi-directional system bus 1518. The keyboard and mouse are for introducing user input to the computer system and communicating that user input to CPU 1513. The computer system of FIG. 15 also includes a video memory 1514, main memory 1515 and mass storage 1512, all coupled to bi-directional system bus 1518 along with keyboard 1510, mouse 1511 and CPU 1513. The mass storage 1512 may include both fixed and removable media, such as magnetic, optical or magnetic optical storage systems or any other available mass storage technology. Bus 1518 may contain, for example, 32 address lines for addressing video memory 1514 or main memory 1515. The system bus 1518 also includes, for example, a 32-bit DATA bus for transferring DATA between and among the components, such as CPU 1513, main memory 1515, video memory 1514 and mass storage 1512. Alternatively, multiplex DATA/address lines may be used instead of separate DATA and address lines.

In the preferred embodiment of this invention, the CPU 1513 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 1515 is comprised of dynamic random access memory (DRAM). Video memory 1514 is a dual-ported video random access memory. One port of the video memory 1514 is coupled to video amplifier 1516. The video amplifier 1516 is used to drive the cathode ray tube (CRT) raster monitor 1517. Video amplifier 1516 is well known in the art and may be implemented by any suitable means. This circuitry converts pixel DATA stored in video memory 1514 to a raster signal suitable for use by monitor 1517. Monitor 1517 is a type of monitor suitable for displaying graphic images.

The computer system described above is for purposes of example only. The present invention may be implemented in any type of computer system or programming or processing environment.

Thus, a method and apparatus for identifying, predicting, and reporting relationships has been described.

We claim:

1. A method of using a computer system for addressing a plurality of levels and a plurality of units to identify relationships between user inputs corresponding to said plurality of units, the method comprising the steps of:

defining in said computer system a class level having a first plurality of units, a type level having a second plurality of units, a variation level having a third plurality of units, and an element level having a fourth plurality of units;

addressing by said computer system each of said first, second, third, and fourth levels, and each of said first, second, third, and fourth plurality of units with a five digit address, a first digit designating a unit in said first plurality of units in said class level, a second digit designating a unit in said second plurality of units in said type level, a third digit designating a unit in said third plurality of units in said variation level, a fourth digit designating a unit in said fourth plurality of units in said element level, and a fifth digit defining the number of units being addressed.

2. The method of claim 1 wherein each of said first plurality of units is addressed with x0000, wherein x=1 for a universe unit, x=2 for a physics unit, x=3 for a psychology unit, and x=4 for a mind unit.

3. The method of claim 1 wherein x0001 defines said class level, and wherein x is selected from the group consisting of 1, 2, 3, and 4.

4. The method of claim 1 wherein each of said second plurality of units is addressed with xx'000, wherein x and x' are selected from the group consisting of 1, 2, 3, and 4.

5. The method of claim 1 wherein xx'002 defines said type level, and wherein x and x' are selected from the group consisting of 1, 2, 3, and 4.

6. The method of claim 1 wherein each of said third plurality of units is addressed with xx'x"00, wherein x, x', and x" are selected from the group consisting of 1, 2, 3, and 4.

7. The method of claim 1 wherein xx'x"03 defines said variation level, and wherein x, x', and x" are selected from the group consisting of 1, 2, 3, and 4.

8. The method of claim 1 wherein each of said fourth plurality of units is addressed with xx'x"x'"0, wherein x, x', x", and x'" are selected from the group consisting of 1, 2, 3, and 4.

9. The method of claim 1 wherein xx'x"x'"4 defines said element level, and wherein x, x', x", and x'" are selected from the group consisting of 1, 2,3, and 4.

* * * * *